United States Patent
Yang et al.

(10) Patent No.: US 8,350,528 B2
(45) Date of Patent: Jan. 8, 2013

(54) BATTERY PACK AND BALANCING METHOD OF BATTERY CELLS

(75) Inventors: Jongwoon Yang, Suwon-si (KR); Segawa Susumu, Suwon-si (KR); Inkyu Park, Suwon-si (KR); Yonguk Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 609 days.

(21) Appl. No.: 12/467,142

(22) Filed: May 15, 2009

(65) Prior Publication Data
US 2010/0194339 A1    Aug. 5, 2010

Related U.S. Application Data

(60) Provisional application No. 61/149,970, filed on Feb. 4, 2009.

(51) Int. Cl.
*H02J 7/00*    (2006.01)
*H02J 7/04*    (2006.01)

(52) U.S. Cl. ........ 320/118; 320/103; 320/116; 320/117; 320/119; 320/120; 320/121; 320/122; 320/123; 320/132; 320/134; 320/152; 320/157

(58) Field of Classification Search .......... 320/103, 320/116, 117, 118, 119, 120, 121, 122, 123, 320/132, 134, 152, 157
See application file for complete search history.

(56) References Cited

U.S. PATENT DOCUMENTS

| 5,644,212 | A  |   | 7/1997  | Takahashi |         |
|-----------|----|---|---------|-----------|---------|
| 5,952,815 | A  | * | 9/1999  | Rouillard et al. | 320/116 |
| 5,994,873 | A  |   | 11/1999 | Shiojima  |         |
| 6,642,693 | B2 | * | 11/2003 | Anzawa et al. | 320/119 |

(Continued)

FOREIGN PATENT DOCUMENTS
EP    1 670 113 A2    6/2006
(Continued)

OTHER PUBLICATIONS

English machine translation of Japanese Publication 11-146570, dated May 28, 1999, previously filed in an IDS dated May 15, 2009.

(Continued)

*Primary Examiner* — Drew A Dunn
*Assistant Examiner* — Nathaniel Pelton
(74) *Attorney, Agent, or Firm* — Christie, Parker & Hale, LLP

(57) ABSTRACT

A balancing method for a battery pack includes balancing battery cells near an end of discharge. A deep discharge of the battery cells can be prevented without using an overdischarge control unit. One battery cell balancing method includes: a balancing check condition determination step for determining whether or not a maximum voltage out of voltages of the battery cells is smaller than a reference voltage; a balancing start condition determination step for determining whether or not a residual capacity difference or voltage difference between the individual battery cells exceeds a reference value; a balancing time calculation step for calculating a balancing time for discharging the battery cell that exceeds the reference value; and a balancing operation step for discharging the selected battery cell when the battery cells are under charge or are at rest or when a discharge current of the battery cells is smaller than a reference current.

19 Claims, 14 Drawing Sheets

U.S. PATENT DOCUMENTS

| | | | | |
|---|---|---|---|---|
| 6,992,463 | B2* | 1/2006 | Yoshio | 320/134 |
| 7,656,131 | B2* | 2/2010 | Embrey et al. | 320/162 |
| 2006/0119319 | A1* | 6/2006 | Sakurai et al. | 320/116 |
| 2006/0232240 | A1* | 10/2006 | Salasoo et al. | 320/119 |
| 2007/0216368 | A1 | 9/2007 | Chandler et al. | |
| 2007/0268000 | A1* | 11/2007 | Kobayashi et al. | 320/118 |
| 2008/0088277 | A1 | 4/2008 | Wang et al. | |
| 2008/0218130 | A1* | 9/2008 | Guo et al. | 320/162 |
| 2008/0252257 | A1* | 10/2008 | Sufrin-Disler et al. | 320/118 |
| 2008/0272739 | A1* | 11/2008 | Carrier et al. | 320/134 |
| 2009/0015206 | A1* | 1/2009 | Seman et al. | 320/134 |
| 2009/0096420 | A1* | 4/2009 | Lupu et al. | 320/122 |
| 2009/0167248 | A1* | 7/2009 | Murao et al. | 320/134 |
| 2010/0066379 | A1* | 3/2010 | Iida | 324/434 |
| 2010/0188046 | A1* | 7/2010 | Liu et al. | 320/118 |

FOREIGN PATENT DOCUMENTS

| | | |
|---|---|---|
| EP | 1 684 398 A1 | 7/2006 |
| EP | 2 083 494 A1 | 7/2009 |
| JP | 05-015076 | 1/1993 |
| JP | 11-146570 | 5/1999 |
| JP | 2005-137090 | 5/2005 |
| JP | 2006-079961 | 3/2006 |
| JP | 2006-166615 | 6/2006 |
| JP | 2006-353010 | 12/2006 |
| JP | 2007-244142 | 9/2007 |
| JP | 2008-154317 | 7/2008 |
| JP | 2008-220149 | 9/2008 |
| JP | 2009-011022 | 1/2009 |
| KR | 10-0616163 | 8/2006 |
| KR | 10-2007-0105220 | 10/2007 |
| WO | WO 2008/053969 A1 | 5/2008 |

OTHER PUBLICATIONS

English machine translation of Japanese Publication, 2006-353010, dated Dec. 28, 2006, previously filed in an IDS dated May 15, 2009.
Extended European Search Report dated Apr. 27, 2010 for corresponding European Application No. 10152566.5, noting the references listed in this IDS.
Machine Translation of Publication No. JP 05-015076; 7 pages.
Machine Translation of Publication No. JP 2000-106220; 17 pages.
European Search Report dated Aug. 16, 2011, for corresponding European Patent application 10152566.5, noting listed reference in this IDS, as well as references previously submitted in an IDS dated Jul. 28, 2010, 7 pages.
Patent Abstracts of Japan, and English machine translation of Japanese Publication 2007-244142, listed above, 18 pages.
Japanese Office action dated Feb. 7, 2012, for corresponding Japanese Patent application 2010-023106, 2 pages.
Patent Abstracts of Japan and English machine translation of Japanese Patent application 2000-106220, previously filed in an IDS dated Oct. 13, 2011, 17 pages.
Patent Abstracts of Japan and English machine translation of Japanese Patent application 2006-079961, 13 pages.
Patent Abstracts of Japan and English machine translation of Japanese Patent application 2009-011022, 24 pages.

* cited by examiner

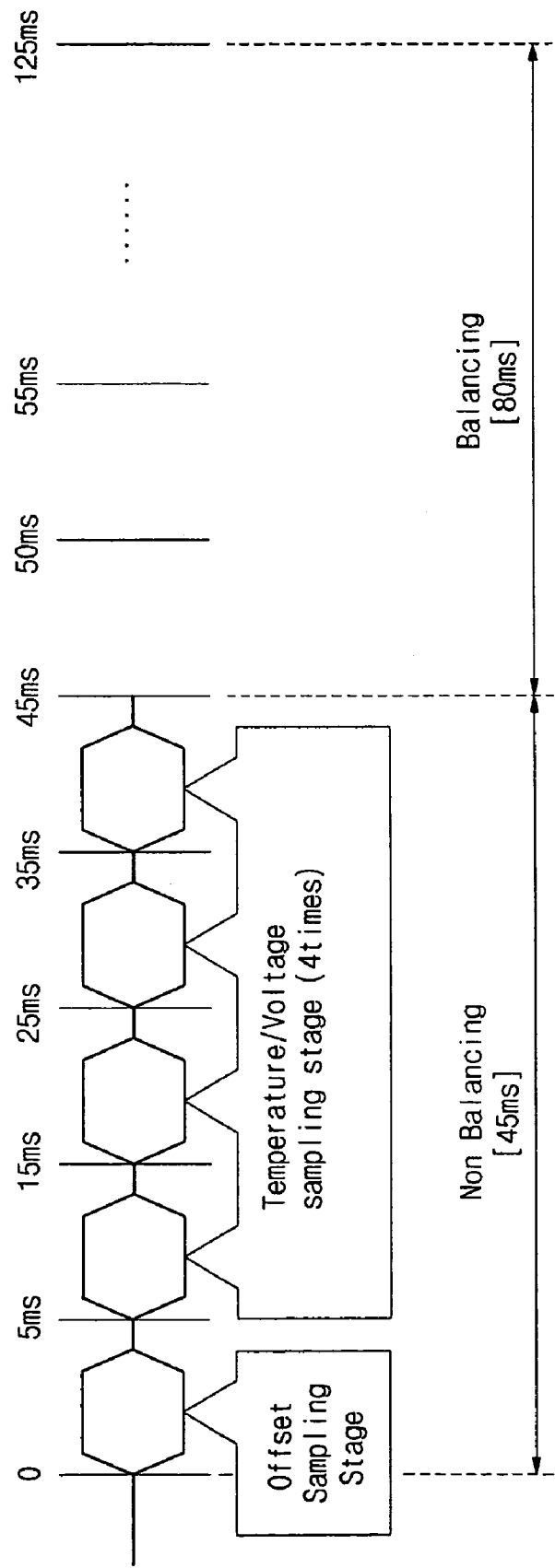

BATTERY PACK AND BALANCING METHOD OF BATTERY CELLS

CROSS-REFERENCE TO RELATED APPLICATION(S)

This applications claims priority to and the benefit of U.S. Provisional Application No. 61/149,970 filed Feb. 4, 2009, the entire content of which is incorporated by reference herein.

BACKGROUND OF THE INVENTION

1. Field of the Invention

The present invention relates to a battery pack and a balancing method of battery cells.

2. Description of the Related Art

Generally, portable electronic equipment, such as notebook computers and hand-held power tools, is equipped with a rechargeable battery pack as a power source. The battery pack is composed of a plurality of battery cells and a battery monitoring unit for controlling overcharge or overdischarge of individual battery cells and calculating battery capacities.

Individual battery cells of the battery pack exhibit capacity variations which may occur due to various reasons associated with the manufacturing process. For these reasons, the battery pack inevitably undergoes variations in charge/discharge voltages of the battery cells during charge/discharge cycles. As a consequence, the battery pack may be susceptible to overcharge of a certain battery cell during the charge process and overdischarge of a certain battery cell during the discharge process. The occurrences of overcharge or overdischarge of certain battery cells in the battery pack result in a decreased capacity of the battery pack as well as degradation and lifespan reduction of the battery pack.

To prevent such occurrences, the battery monitoring unit is generally provided with a balancing circuit to minimize a voltage difference between the plurality of battery cells in series connection. That is, the battery monitoring unit senses a voltage of each battery cell and performs forcible discharge of a battery cell having a relatively high voltage when a voltage difference between the battery cells is larger than a reference value, such that all the battery cells have the same voltage. Further, balancing of the battery cells is initiated near the end of charge so as to save power.

For these reasons, the balancing of the battery cells in a conventional art has been carried out near the end of charge and with reference only to a voltage difference between the battery cells, so it cannot be said that perfect and accurate balancing of the battery cells was achieved. That is, a conventional battery cell balancing method is not efficient in terms of inhibiting overdischarge of the battery cells. Further, since the battery pack used in hand-held power tools is not provided with an overdischarge control unit, there is a higher chance for one of its battery cells to be in a deep discharge state.

As discussed above, the battery pack mounted in a special-purpose device such as hand-held power tool is typically not equipped with an overdischarge control unit system. For example, in order to enhance a maximum power output of the hand-held power tools, hand-held power tool makers typically require no installation of the overdischarge control unit in the battery pack. As a result, there is a high probability that a certain battery cell out of plural battery cells is under deep discharge conditions. Further, such an overdischarge event may bring about loading of a reverse voltage to a certain battery cell out of a plurality of series-connected battery cells.

Once a certain battery cell out of the plurality of series-connected battery cells is exposed to a reverse voltage state, the corresponding battery cell then undergoes, for example, the opening of a current interruptive device (CID). In other words, when a reverse voltage is applied to a cylindrical lithium ion battery, the battery is in a highly unstable state, which triggers the operation of safety devices such as CID, for the safety of users. The CID is irreversibly operated. Therefore, the battery cell is not normally operated again once the CID is operated. That is, the battery pack should be replaced with a new one.

SUMMARY OF THE INVENTION

An aspect of exemplary embodiments according to the present invention is to provide battery pack and battery cell-balancing method, which are capable of preventing deep discharge of a certain battery cell without an overdischarge control unit, through the initiation of battery cell balancing near the end of discharge.

Another aspect of exemplary embodiments according to the present invention is to provide battery pack and battery cell-balancing method, which are capable of preventing damage to the battery cells due to application of a reverse voltage, through the prevention of possible deep discharge of the battery cells.

The above and other aspects can be accomplished in one embodiment by the provision of a balancing method of battery cells including: a balancing check condition determination for determining whether or not a maximum voltage out of voltages of the battery cells is smaller than a reference voltage; a balancing start condition determination for determining whether or not a residual capacity difference or voltage difference between the individual battery cells exceeds a reference value; a balancing time calculation for calculating a balancing time necessary for discharge of the battery cell exceeding the reference value; and a balancing operation for discharging the selected battery cell when the battery cells are under charge or are at rest or when a discharge current of the battery cells is smaller than a reference current.

In an exemplary embodiment according to the present invention, a balancing method for a battery pack including a plurality of battery cells is provided. According to the method, the battery cells are balanced near an end of discharge. A deep discharge of the battery cells may be prevented without using an overdischarge control unit.

In another exemplary embodiment according to the present invention, a balancing method for a battery pack including a plurality of battery cells is provided. The method includes: determining whether or not a first condition for performing balancing of the discharge cells exists; determining whether or not a second condition for performing balancing of the discharge cells exists; if the first and second conditions exist, calculating a balancing time; and performing balancing operation in accordance with the balancing time.

The determination of whether or not the first condition exists may include determining whether or not a maximum voltage among voltages of the plurality of battery cells is smaller than a reference voltage. The reference voltage may be between about 2.0V and about 3.7V.

The determination of whether or not the second condition exists may include determining whether or not a residual capacity difference or a voltage difference between two of the plurality of battery cells exceeds a reference value.

The calculation of the balancing time may include: selecting a battery cell to be discharged from among the plurality of battery cells; and calculating the balancing time for the selected battery cell.

The selecting the battery cell to be discharged may include selecting at least one battery cell other than a battery cell having a lowest residual capacity from among the plurality of battery cells. The calculating the balancing time may include calculating a balancing time for a residual capacity of the selected at least one battery cell to become substantially equal to the lowest residual capacity.

The selecting the battery cell to be discharged may include selecting at least one battery cell other than a battery cell having a lowest voltage from among the plurality of battery cells. The calculating the balancing time may include calculating a balancing time for a voltage of the selected at least one battery cell to become substantially equal to the lowest voltage.

The performing of the balancing operation may include discharging a selected battery cell from among the plurality of battery cells for the calculated balancing time. The discharging of the selected battery cell may be performed intermittently.

The determination of whether or not the first condition exists may include determining during a time period that exceeds a reference time: whether or not a maximum voltage among voltages of the plurality of battery cells is smaller than a reference voltage; and whether or not a current of the battery pack is smaller than a reference current. The first condition may exist if, during the time period greater than or equal to the reference time, the maximum voltage remains less than the reference voltage and the current remains less than the reference current. Either a charge current or a discharge current can be used as the current compared to the reference current. If the maximum voltage is equal to or greater than the reference voltage, the method may further include determining whether or not the balancing time was previously set. The method may further include determining whether or not a cumulative time for the balancing operation is less than the balancing time, wherein the balancing operation may be performed if the cumulative time is less than the balancing time.

The determination of whether or not the second condition exists may include: calculating full charge capacities (FCCs) of the plurality of battery cells; calculating residual capacities of the plurality of battery cells and residual capacity differences between the battery cells, using the calculated FCCs; and determining whether or not the residual capacity difference between two of the plurality of battery cells exceeds a reference value. If the residual capacity difference exceeds the reference value, the second condition exists and the calculating balancing time further includes selecting a battery cell to be balanced from among the plurality of battery cells, wherein the selected battery cell is not a battery cell having a lowest residual capacity of the plurality of battery cells.

The balancing operation may be performed if the first and second conditions exist or if a cumulative time for the balancing operation did not yet exceed the calculated balancing time.

The performance of balancing operation may include: determining balancing operation conditions including determining whether or not the battery pack is under charge or is at rest until discharge following the charge, or if the battery pack is under discharge, determining whether or not the discharge current of the battery pack is smaller than the reference current; and if the balancing operation conditions are met, discharging a selected battery cell from among the plurality of battery cells. If the battery pack is not under charge, is not at rest and the discharge current of the battery pack is larger than the reference current, balancing of the plurality of battery cells may be terminated. The balancing operation may be temporarily stopped while the battery pack is discharged at a level above a reference current.

In another exemplary embodiment according to the present invention, a battery cell balancing system for a battery pack including a plurality of battery cells, is provided. The battery cell balancing system includes: a plurality of balancing switches, each of the balancing switches coupled between positive and negative terminals of a corresponding one of the battery cells; a plurality of balancing resistors, each of the balancing resistors coupled in series with a corresponding one of the balancing switches between the positive and negative terminals of the corresponding one of the battery cells; and a logic circuit for controlling the balancing switches to selectively discharge the battery cells through the respective balancing resistors near an end of discharge, such that the battery cells have same or similar voltages as each other. An overdischarge control unit may be not used while preventing deep discharge of the battery cells.

The battery cell balancing system may include a control unit for controlling the logic circuit to control the balancing resistors, the control unit including: means for determining whether or not a first condition for performing balancing of the discharge cells exists; means for determining whether or not a second condition for performing balancing of the discharge cells exists; means for calculating, if the first and second conditions exist, a balancing time; and means for performing balancing operation in accordance with the balancing time.

In another exemplary embodiment according to the present invention, a battery pack includes: a plurality of battery cells coupled together; and a battery cell balancing system including: a plurality of balancing switches, each of the balancing switches coupled between positive and negative terminals of a corresponding one of the battery cells; a plurality of balancing resistors, each of the balancing resistors coupled in series with a corresponding one of the balancing switches between the positive and negative terminals of the corresponding one of the battery cells; and a logic circuit for controlling the balancing switches to selectively discharge the battery cells through the respective balancing resistors near an end of discharge, such that the battery cells have same or similar voltages as each other.

The battery pack may further include a discharge terminal and a charge terminal, each of the discharge and charge terminals coupled to a battery terminal of at least one of the battery cells, wherein an overcharge control unit is interposed between the battery terminal and the charge terminal, and wherein an overdischarge control unit is not interposed between the battery terminal and the discharge terminal.

The battery pack may further include an analog switch coupled in parallel with one of the plurality of battery cells to sense a voltage of the one of the plurality of battery cells. The analog switch may include a flying capacitor for storing the voltage of the one of the plurality of battery cells to provide the stored voltage to a control unit for controlling the logic circuit to control the balancing switches. The battery pack may further include a voltage sensing circuit for sensing voltages of the battery cells, and providing the sensed voltages to the control unit.

BRIEF DESCRIPTION OF THE DRAWINGS

The accompanying drawings illustrate embodiments of the present invention, and together with the description, serves to explain the principles of the embodiments of the present invention:

FIGS. 10a and 10b are timing views illustrating a balancing timing of a battery cell-balancing method in accordance with one embodiment of the present invention;

FIG. 11b is a circuit diagram illustrating a balancing circuit and a battery cell corresponding to FIG. 11a;

DETAILED DESCRIPTION OF EMBODIMENTS

Now, embodiments of the present invention will be described in more detail with reference to the accompanying drawings.

Figure 1:
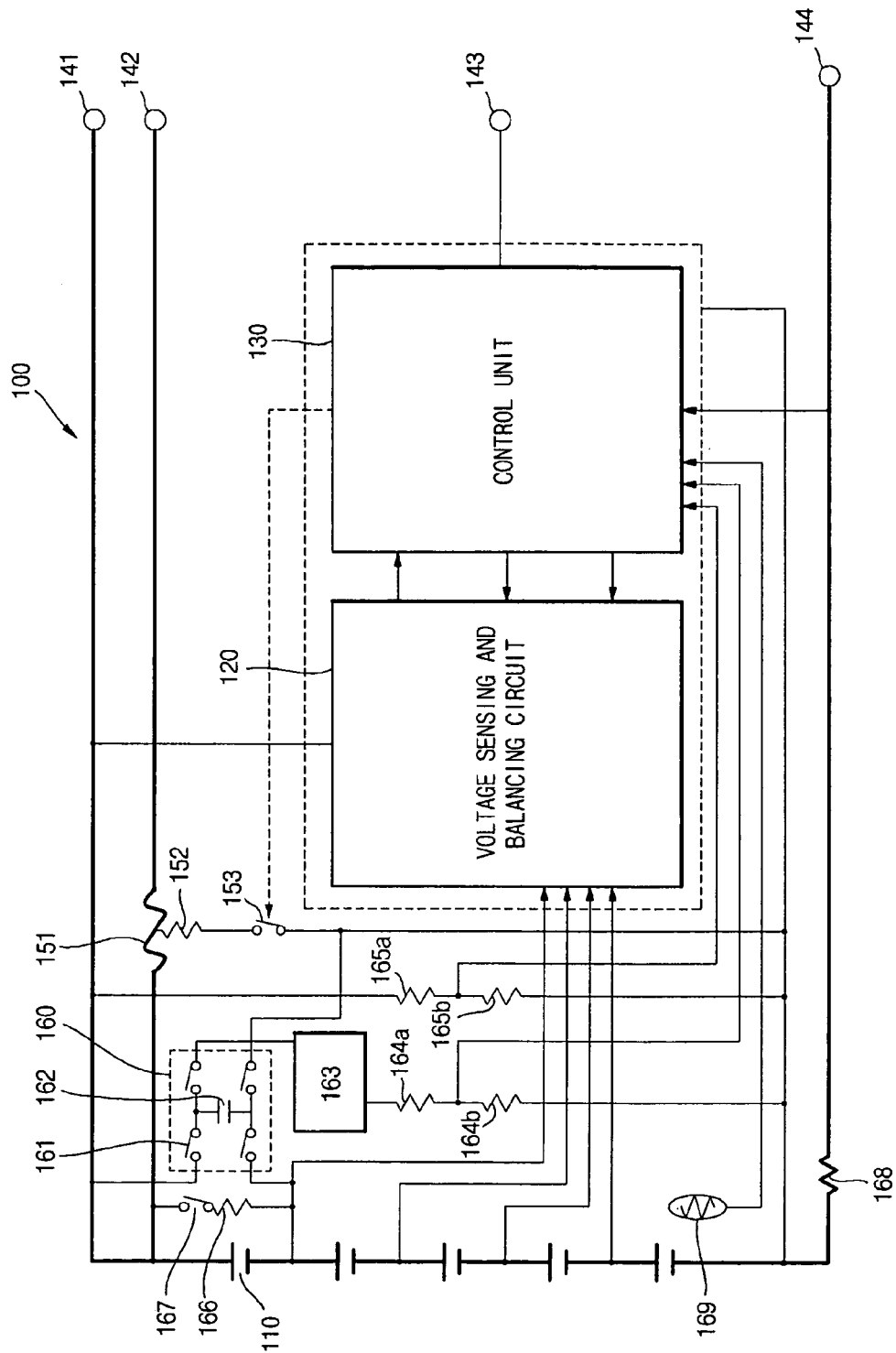
FIG. 1 is a block diagram illustrating a construction of a battery pack in accordance with one embodiment of the present invention.

FIG. 1 is a block diagram illustrating a construction of a battery pack in accordance with one embodiment of the present invention.

As shown in FIG. 1, a battery pack 100 in accordance with one embodiment of the present invention includes a plurality of rechargeable battery cells 110 coupled in series, a voltage sensing and balancing circuit 120 for sensing voltages of the battery cells and concurrently performing cell balancing, and a control unit 130.

Each of the battery cells 110 may be a lithium ion battery cell rechargeable up to about 4.2 V, but the present invention is not limited thereto. In addition, the voltage sensing and balancing circuit 120 may include various kinds of analog front ends (AFEs) which are prepared for use in the lithium ion battery, but the present invention is not limited thereto. Further, the control unit 130 may also include various kinds of microcomputers which are prepared for use in the lithium ion battery, but the present invention is not limited thereto. The voltage sensing and balancing circuit 120 in one embodiment provides power to the control unit 130, and also provides sensed voltage information of four battery cells 110 to an analog-to-digital converter in the control unit 130. The control unit 130 provides charging/discharging control signal and balancing control signal corresponding to data (e.g., voltage information of the battery cells 110) processed by a program or algorithm to the voltage sensing and balancing circuit 120.

The battery pack 100 includes a discharge terminal 141 for discharging the battery cells 110, a charge terminal 142 for charging the battery cells 110, a communication terminal 143 for single wire communication with an external device, and a negative electrode terminal 144 for charging or discharging the battery cells 110.

The discharge terminal 141 and the charge terminal 142 are electrically connected to a positive electrode of the battery cell 110, the negative electrode terminal 144 is electrically connected to a negative electrode of the battery cell 110, and the communication terminal 143 is electrically connected to the control unit 130.

Further, the battery pack 100 includes a fuse 151 connected between the battery cell 110 and the charge terminal 142 to prevent overcharge of the battery cells. In FIG. 1, the fuse 151 is further connected to a heat resistor 152 and a switch 153. The switch 153 may be turned-on or turned-off in response to control signals from the control unit 130. The present invention is of course not limited to such a configuration of the overcharge prevention member. By way of example, in other embodiments, the overcharge prevention member may be composed of a plurality of field-effect transistors.

The battery pack according to one embodiment of the present invention, as described above, includes the discharge terminal 141 and the charge terminal 142 and has therefore different pathways for charge and discharge of the battery cells. In this connection, overcharge of the battery cells 110 is prevented by the fuse 151, upon charge of the battery cells, but overdischarge of the battery cells 110 is not prevented upon discharge of the battery cells. Therefore, the battery pack 100 in accordance with one embodiment of the present invention has balancing functions of the battery cells 110 in order to prevent deep discharge, degradation and capacity lowering of a certain battery cell 110.

However, the cell balancing method in accordance with embodiments of the present invention is not intended only for use in the aforesaid structure of the battery pack 100. That is, the cell balancing method in accordance with embodiments of the present invention can be applied to any type of battery packs which employ in common the discharge terminal 141 and the charge terminal 142 and has an overdischarge prevention switch or overcharge prevention switch embodied in the form of a field-effect transistor.

The battery pack 100 in accordance with one embodiment of the present invention includes five series-connected battery cells 110. However, the voltage sensing and balancing circuit 120 developed up to date has been designed to sense only voltages for four battery cells 110. That is, a voltage of the fifth battery cell 110 cannot be sensed without circuit modifications.

Therefore, the battery pack 100 according to one embodiment of the present invention further includes an analog switch 160 for sensing a voltage of the fifth battery cell 110. The analog switch 160 is parallel-connected between the positive electrode and the negative electrode of the fifth battery cell 110. The analog switch 160 includes four switches 161 and one flying capacitor 162. The analog switch 160 charges a voltage of the fifth battery cell 110 in the flying capacitor 162. Further, the analog switch 160 outputs the voltage stored in the flying capacitor 162 to the control unit 130. For these purposes, an OP-Amp 163 and voltage-dividing resistors 164a,164b are further connected between the analog switch 160 and the control unit 130. Further, voltage-dividing resistors 165a,165b are additionally connected between the discharge terminal 141 and the negative electrode terminal 144, and the voltage-dividing resistors 165a, 165b output an overall voltage of the battery pack 100 to the control unit 130. The analog switch 160 outputs the voltage of the fifth battery cell 110 charged in the flying capacitor 162, according to the turn-on or turn-off of the switches 161 in response to control signals of the control unit 130.

In addition, the battery pack 100 according to one embodiment of the present invention further includes a balancing resistor 166 and a balancing switch 167 for balancing of the fifth battery cell 110. That is, the balancing resistor 166 and the balancing switch 167 are electrically connected between the positive electrode and the negative electrode of the fifth battery cell 110. The balancing switch 167 may be turned-on or turned-off in response to control signals from the control unit 130. In addition, the balancing resistors and balancing switches for the remaining four battery cells 110 are contained in the voltage sensing and balancing circuit 120.

The cell balancing method in accordance with one embodiment of the present invention is not necessarily applicable only to the battery pack 100 including five series-connected battery cells 110 as described above. That is, the balancing method in accordance with one embodiment of the present invention is also applicable to the battery pack having, for example, three, four or six battery cells 110 that are series-connected. Depending on the number of battery cells, the analog switch 160 may not be needed, or additional analog switches 160 or circuitry having a similar function may be needed. In addition, the battery pack 100 of the described embodiment further includes a current-sense resistor 168 for sensing currents of the battery cells 110 and a temperature sensor 169 for sensing temperatures of the battery cells 110.

Figure 2:
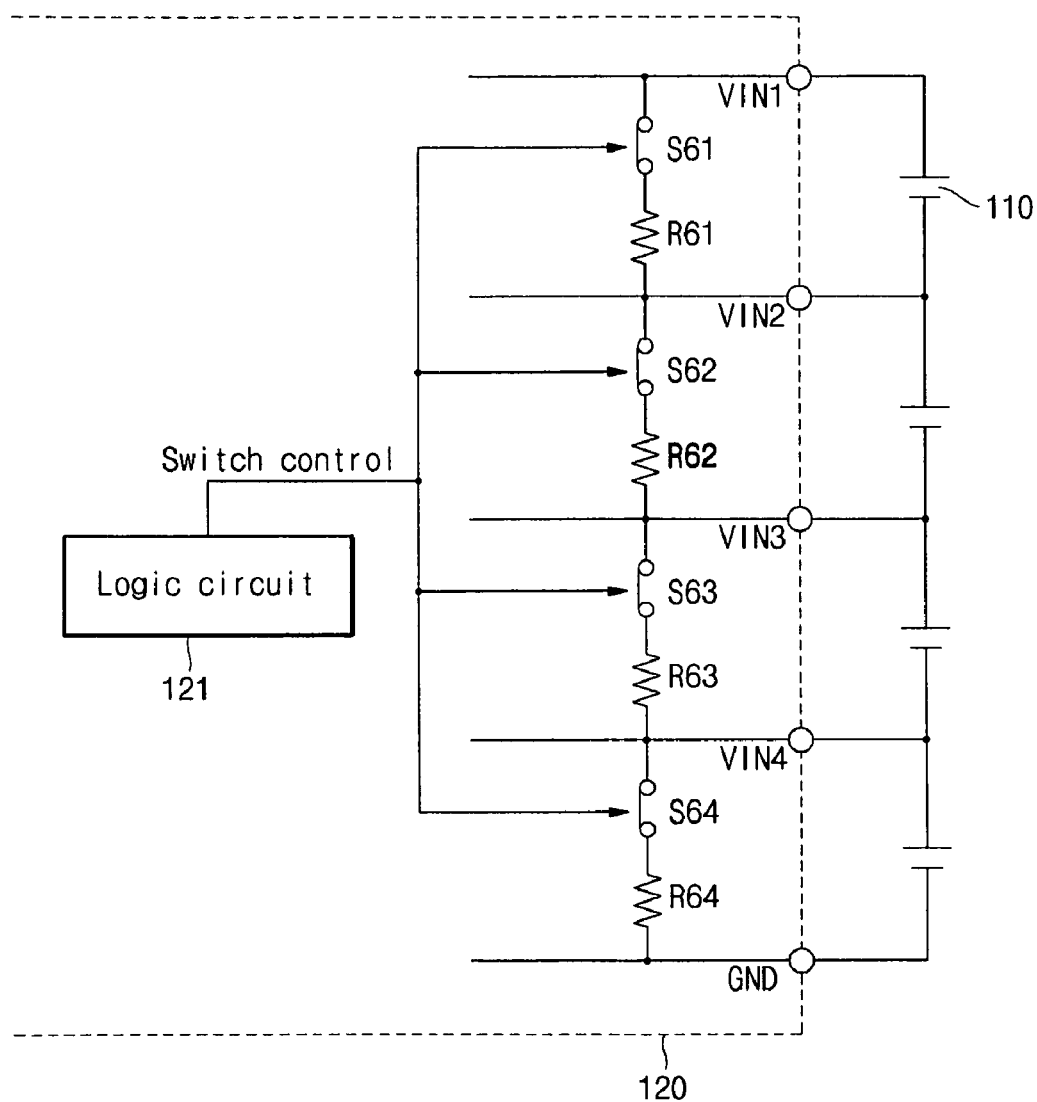
FIG. 2 is a circuit diagram illustrating a balancing circuit of a battery pack in accordance with one embodiment of the present invention.

FIG. 2 is a circuit diagram illustrating a balancing circuit of a battery pack in accordance with one embodiment of the present invention.

As shown in FIG. 2, the voltage sensing and balancing circuit 120 includes a logic circuit 121, a plurality of balancing switches S61, S62, S63, S64 that are sequentially or concurrently turned-on or turned-off by the logic circuit 121, and a plurality of balancing resistors R61, R62, R63, R64 connected between the balancing switches S61, S62, S63, S64. In the embodiment illustrated in FIG. 2, each of the battery cells 110 is connected in parallel with a respective one of the balancing switches S61, S62, S63, S64 and a respective one of the balancing resistors R61, R62, R63, R64 that are coupled in series. Although a voltage sensing and balancing circuit for a 4S1P battery pack is shown in FIG. 2, the present invention is not limited thereto.

According to such a configuration of the voltage sensing and balancing circuit 120, the logic circuit 121 separately controls the balancing switches S61, S62, S63, S64, whereby the individual battery cells 110 are independently discharged by using the balancing resistors R61, R62, R63, R64. That is, the battery cells 110 are balanced to have similar or the same voltage by the balancing resistors R61, R62, R63, R64. The balancing of the battery cells 110 is carried out by a method which will be discussed hereinafter.

With regard to the battery pack 100 having the aforementioned configuration, an example of the battery cell-balancing method will now be illustrated which is carried out primarily by the control unit 130. As well known in the art, the control unit 130 includes a central processing unit (CPU) for carrying out the method according to embodiments of the present invention, and a memory containing programs and various parameters for carrying out the method according to embodiments of the present invention.

Figure 3:
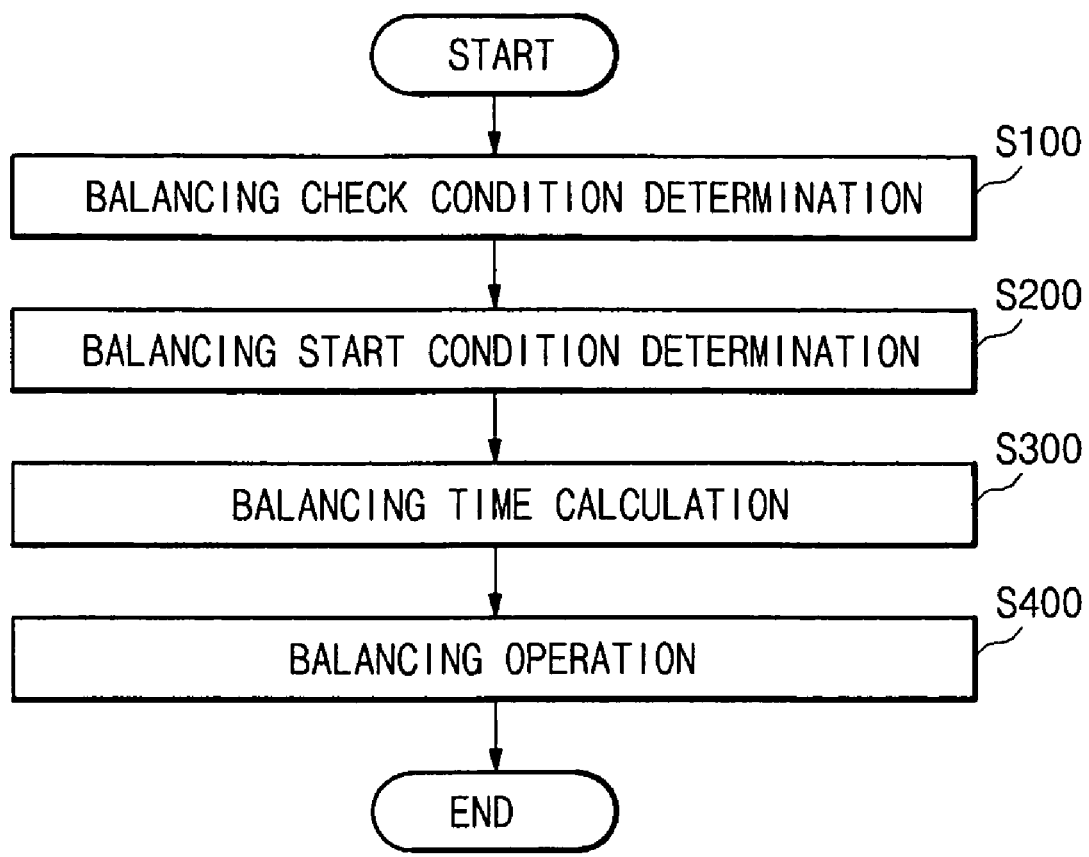
FIG. 3 is a schematic flow chart illustrating a balancing method of a battery cell in accordance with one embodiment of the present invention.

FIG. 3 is a schematic flow chart illustrating a balancing method of battery cells in accordance with one embodiment of the present invention.

As shown in FIG. 3, the schematic balancing method of battery cells in accordance with one embodiment of the present invention includes a balancing check condition determination step (S100), a balancing start condition determination step (S200), a balancing time calculation step (S300) and a balancing operation step (S400).

In one exemplary embodiment, the steps S100 through S300 are performed every 10 minutes, for example. If the balancing start condition is satisfied in the step S200, the balancing operation step (S400) is performed. The balancing operation continues to be performed during the 10 minute interval as long as certain balancing operation conditions are met. The balancing operation conditions are checked every 125 milliseconds (ms), for example. The time intervals of 10 minutes and 125 ms can be different in other embodiments. For example, in some embodiments, the first time intervals between the performance of the steps S100 through S300 may be more or less than 10 minutes, and the second time intervals between the checking of balancing operation conditions may be more or less than 125 ms, where the first time interval is longer than the second time interval.

The balancing check condition determination step (S100) in one embodiment is carried out by determining whether or not a maximum voltage out of voltages of all of the battery cells is smaller than a reference voltage. For example, the balancing check condition determination step (S100) includes determining whether a maximum voltage out of voltages of all of the battery cells is larger or smaller than a value of about 2.0 to 3.7 V. If a maximum voltage out of voltages of the battery cells is smaller than a value of about 2.0 to 3.7 V, a next step, i.e. the balancing start condition determination step (S200) is then carried out. This is the first condition for calculation of a balancing time in the step S300.

Although the balancing check condition determination step (S100) carries out the comparison and determination of more conditions, details thereof will be described in more detail hereinafter. Further, it should be understood that the value of 2.0 to 3.7 V is provided for illustrative purposes only, but the present invention is not limited thereto. By way of example, in one embodiment, when the normal operation voltage of the battery cell is 4.2V, 3.7V is a critical voltage below which the battery cell may not operate properly.

The balancing start condition determination step (S200) includes determining whether or not a residual capacity difference or voltage difference between the individual battery cells exceeds a reference value. For example, the balancing start condition determination step (S200) may be carried out by determining whether a residual capacity difference between the individual battery cells is larger or smaller than a value of about 15~45 mAh (e.g., 30 mAh). Further, the balancing start condition determination step (S200) may also be carried out by determining whether a voltage difference between the individual battery cells is larger or smaller than a value of about 10~20 mV (e.g., 15 mV). If a residual capacity difference between the battery cells is larger than a value of about 30 mAh or a voltage difference between the battery cells is larger than a value of about 15 mV, a next step, i.e., balancing time calculation step (S300), is carried out. Further, it should be understood that the values of about 30 mAh and about 15 mV are provided for illustrative purposes only, but the present invention is not limited thereto. This is the second condition for calculation of a balancing time in the step S300.

The balancing time calculation step (S300) includes selecting a battery cell or cells in need of discharge from among the battery cells and calculating a balancing time (discharge time) necessary for the selected battery cell or cells. For example, the balancing time calculation step (S300) may be carried out by selecting a battery cell or cells having a relatively high residual capacity (e.g., all battery cells except for the battery cell having the lowest residual capacity) and calculating a balancing time required to achieve the state where the residual capacity of the selected battery cell or cells becomes equal to that of the battery cell having a relatively low residual capacity (e.g., the battery cell having the lowest residual capacity). Further, the balancing time calculation step (S300) may be carried out by selecting a battery cell or cells having a relatively high voltage (e.g., all battery cells except for the battery cell having the lowest voltage) and calculating a balancing time required to achieve the state where the voltage of the selected battery cell or cells becomes equal to that of the battery cell having a relatively low voltage (e.g., the battery cell having the lowest voltage).

The balancing operation step (S400) includes discharging of the selected battery cell or cells for the calculated balancing period of time. Although the balancing operation step (S400) carries out the comparison and determination of more conditions, details thereof will be described in more detail hereinafter.

As such, exemplary embodiments according to the present invention carry out the balancing of the battery cells when a residual capacity or voltage difference between the individual battery cells exceeds the reference value under the condition where a maximum voltage of the battery cells is smaller than the reference voltage (e.g. 2.0 to 3.7 V). Therefore, excellent balancing of the battery cells is ensured even near the end of discharge.

Further, exemplary embodiments according to the present invention can prevent deep discharge of a certain battery cell or cells without an overdischarge control unit, by carrying out the battery cell balancing near the end of discharge, not the end of charge. The term deep discharge typically refers to discharging of a battery to 20% or less of its charge capacity. The exemplary embodiments disclosed herein, of course, can be applied to prevention of discharging to less than or more than 20% of the charge capacity.

Figure 4:
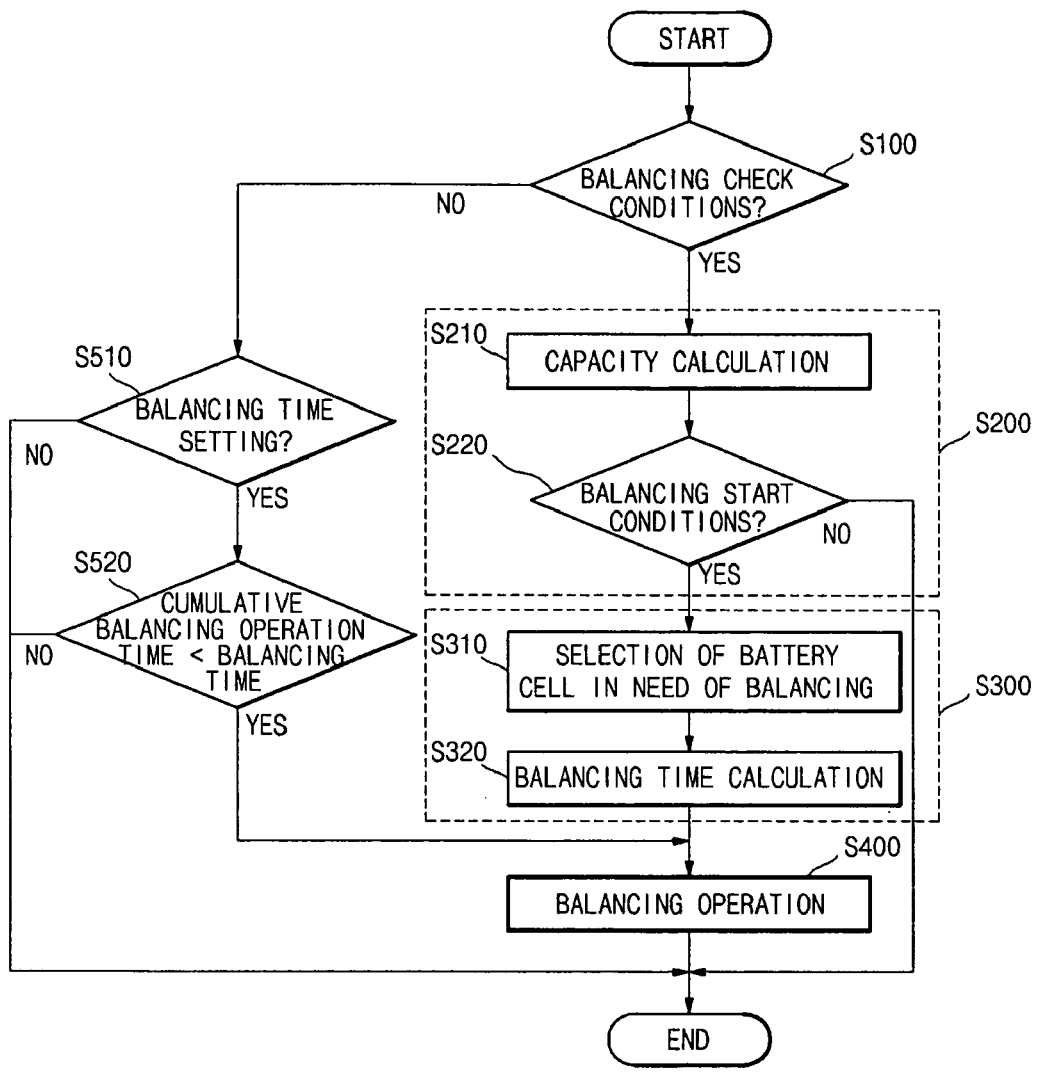
FIG. 4 is a detailed flow chart illustrating a battery cell-balancing method in accordance with one embodiment of the present invention.

FIG. 4 is a detailed flow chart illustrating a battery cell-balancing method in accordance with one embodiment of the present invention. In the context of embodiments of the present invention, the battery cell-balancing method will be discussed with reference to capacity differences between the battery cells.

As shown in FIG. 4, the battery cell balancing method in accordance with one embodiment of the present invention may further include a balancing time set-up determination step (S510) and a balancing time comparison and determination step (S520), in addition to the balancing check condition determination step (S100), the balancing start condition determination step (S200), the balancing time calculation step (S300) and the balancing operation step (S400).

First, the balancing check condition determination step (S100) includes determining whether the maximum voltage and current (charge current or discharge current) of the battery cells are larger or smaller than a reference voltage and a reference current (e.g., a predetermined reference voltage and a predetermined reference current), respectively, and a duration time exceeds a reference time (e.g., a predetermined reference time). Based on the results of the determination step, when the maximum voltage, current and duration time of the battery cells meet all of the reference voltage, reference current and reference time, a next step, that is, a capacity calculation step (S210) is carried out. In addition, when the maximum voltage of the battery cells is equal to or greater than the reference voltage, the balancing time set-up determination step (S510) is carried out. In this regard, the balancing check condition determination step (S100) may be carried out with a relatively long time interval (e.g., 10 minutes). Although the balancing check condition determination step (S100) may be carried out about every 10 minutes, for example, the present invention is not limited thereto. The balancing time set-up determination step (S510) and/or the balancing time comparison and determination step (S520) may be carried out when the balancing check conditions are not met in the balancing check condition determination step (S100) every 10 minutes. The balancing check condition determination step (S100) will be described in more detail hereinbelow.

Next, the step (S200) may include the capacity calculation step (S210) and a balancing start condition determination step (S220).

The capacity calculation step (S210) is carried out by calculating a discharge capacity of the individual battery cells based on voltages of the battery cells upon full charge/discharge thereof, which were previously sensed and stored in a memory, and calculating a residual capacity and a residual capacity difference of and between the individual battery cells based on the calculated discharge capacity.

The balancing start condition determination step (S220) includes determining whether or not a residual capacity difference between the individual battery cells exceeds the reference value. For example, it is determined whether or not a residual capacity difference between the first battery cell and the second battery cell is larger than the reference value. If the residual capacity difference between the battery cells exceeds the reference value, a next step (S310) is carried out. If the residual capacity difference between the first battery cell and the second battery cell does not exceed the reference value when it is measured according to the balancing start condition determination step (S220), the battery cell balancing in accordance with the described embodiment of the present invention is terminated.

Thereafter, the step (S300) may include a step (S310) of selecting a battery cell or cells in need of balancing and a step (S320) of calculating a balancing time.

The balancing-required battery cell selection step (S310) includes the selection of a battery cell or cells that has a relatively high residual capacity. For example, if a residual capacity of the first battery cell remains relatively higher than that of the second battery cell, the first battery cell is selected as a battery cell in need of balancing (discharge). Here, all battery cells, except for the battery cell having the lowest remaining residual capacity, may be selected.

The balancing time calculation step (S320) includes the calculation of a balancing time (discharge time) necessary for the selected battery cell or cells. For example, the required balancing time may be calculated according to the following equation.

$$\text{Balancing time} = \text{Capacity difference} / \text{Balancing current}$$

Next, the balancing operation step (S400) includes discharging of the selected battery cell or cells for the precalculated balancing period of time. That is, a given balancing current is allowed to flow into the selected battery cell or cells for a given balancing time, such that the residual capacity of the selected battery cell or cells becomes equal to that of the remaining battery cells. In addition, the balancing operation step (S400) is not continuously carried out, but may be intermittently carried out with a relatively short time interval. That is, the discharge of the battery cell or cells may be carried out, for example, about every 125 ms. Further, it should be understood that such a value is provided for illustrative purposes only, but the present invention is not limited thereto. The balancing operation step (S400) will be described in more detail hereinbelow.

The balancing time set-up determination step (S510) is carried out when a maximum voltage of the battery cell is equal to or greater than the reference voltage (e.g. 2 to 3.7 V), as measured in the balancing check condition determination step (S100) as above.

Here, the balancing time is present only when the balancing time calculation step (S320) was carried out in the previous cycle. That is, when the balancing time calculation step (S320) was carried out in the previous cycle, the balancing time (discharge time) was stored in a memory and the control unit reads out the balancing time stored in the memory, whereby it is possible to confirm the presence of the balancing time. When the battery cell balancing method in exemplary embodiments accordance with the present invention is first carried out, there is no balancing time in the balancing time set-up determination step (S510) and therefore the battery cell balancing in exemplary embodiments accordance with the present invention is terminated (e.g., immediately terminated).

Next, the balancing time comparison and determination step (S520) includes determining whether or not a total cumulative time for the balancing operation of the battery cell is smaller than the balancing time (e.g., the balancing time calculated and stored in the balancing time calculation step (S320)). If the total cumulative balancing operation time is smaller than the balancing time (balancing time as calculated in the balancing time calculation step (S320)), the balancing operation step (S400) is carried out. On the other hand, if a value of the cumulative balancing operation time is equal to or greater than the balancing time, the battery cell balancing in exemplary embodiments in accordance with the present invention is terminated (e.g., immediately terminated).

In this manner, the balancing check condition determination step (S100) may be carried out with a relatively long time interval (for example, about 10 minutes), whereas the balancing operation step (S400) may be carried out with a relatively short time interval (for example, about 125 ms). These values may vary depending on the capacity or characteristics of the battery pack. Therefore, the present invention is not limited thereto.

In addition, when the determinations are "NO" in the step (S220) and either the step (S510) or the step (S520), the battery cell balancing in accordance with the described embodiment of the present invention maintains a termination state until the balancing check condition determination step (S100) of a next cycle. Hence, the step (S220), the step (S510) and the step (S520) may be regarded as balancing finishing conditions.

Figure 5:
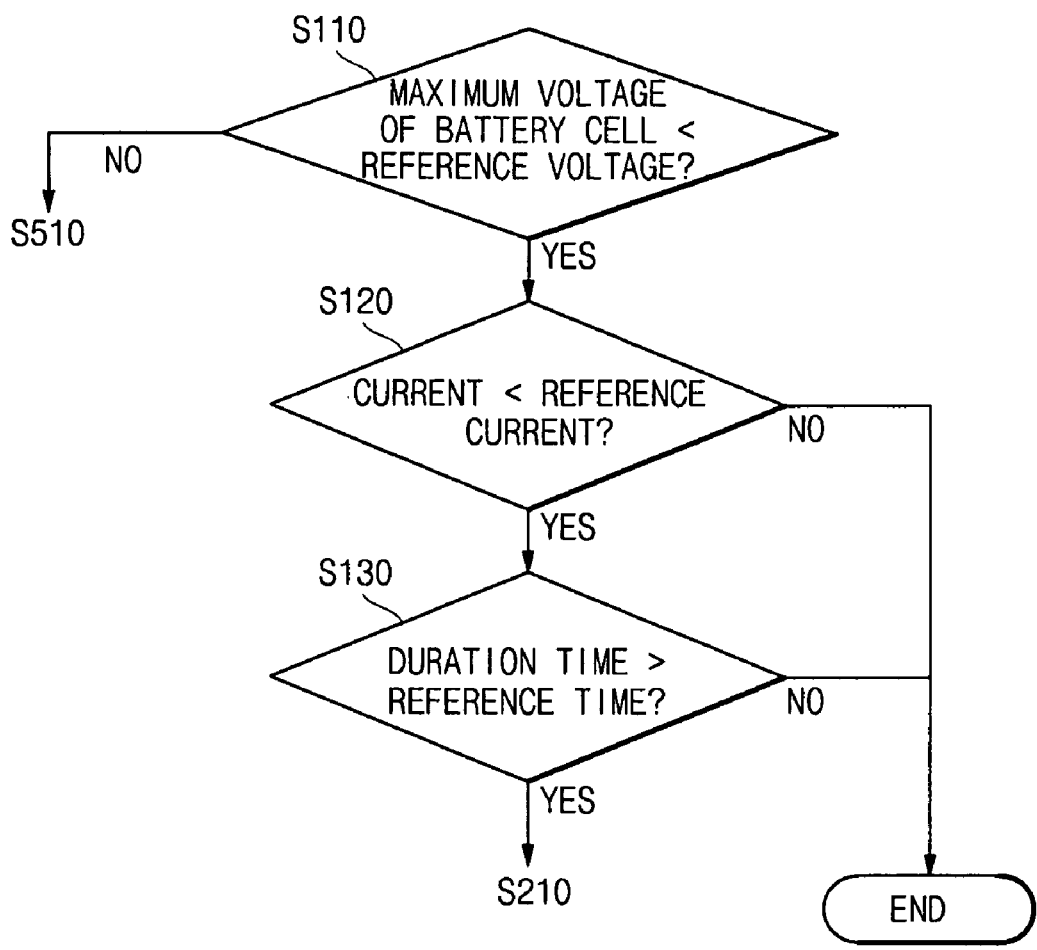
FIG. 5 is a detailed flow chart illustrating a balancing check condition determination step of a battery cell-balancing method in accordance with one embodiment of the present invention.

FIG. 5 more specifically shows a flow chart illustrating a balancing check condition determination step of a battery cell-balancing method in accordance with one embodiment of the present invention.

As shown in FIG. 5, the balancing check condition determination step includes a step (S110) of determining whether or not a maximum voltage of the battery cell is smaller than the reference voltage, a step (S120) of determining whether or not a current (charge or discharge current) is smaller than the reference current, and a step (S130) of determining whether or not a duration time is greater than the reference time.

The step (S110) of determining whether or not a maximum voltage of the battery cell is smaller than the reference voltage determines whether or not a maximum voltage out of voltages of plural battery cells is smaller than the predetermined reference voltage. For instance, the reference voltage may be set to a value of about 2.0 to 3.7 V. The reference voltage of about 2.0 to 3.7 V corresponds to about 0 to 60% in terms of capacity. When the reference voltage is set below about 2.0 V, the battery capacity approximates to nearly 0% (see RSOC vs. OCV graph of FIG. 7), thus making it very difficult or impossible to obtain the battery cell balancing. Further, when the reference voltage is set to a value that is higher than about 3.7 V, the battery cell balancing is achieved at a relatively high voltage level. Therefore, when the battery cell is rapidly discharged to a low voltage state, a capacity difference is relatively increased between the battery cells. That is, since the battery cell balancing is carried out at the relatively high voltage level, the battery cell balancing at a relatively low voltage level is not matched and therefore the battery cells may be susceptible to a deep discharge state. On the other hand, when a maximum voltage of the battery cell in the step (S110) is greater than a value of about 2.0 to 3.7 V, the balancing time set-up determination step (S510) is carried out. That is, when a maximum voltage of the battery cell is greater than the reference voltage, the battery cell balancing in accordance with the described embodiment of the present invention is terminated if the balancing time was not set. Further, if the cumulative time for the balancing operation exceeds the balancing time even when the balancing time was set, the battery cell balancing in accordance with the described embodiment of the present invention is terminated.

The step (S120) of determining whether or not the current value is smaller than the reference current value determines whether or not a value of the current being discharged through the battery pack or a value of charge current flowing into the battery pack is smaller than the reference current value. For example, it is determined whether or not the current of the battery pack is smaller than the reference current value of about 10~30 mA (e.g., 20 mA, 20 mA is an absolute value). This reference current may vary depending on the capacity or characteristics of the battery pack. Therefore, the present invention is not limited thereto.

The step (S130) of determining whether or not the duration time is greater than the reference time determines whether or not the above-mentioned conditions, that is, the conditions where the maximum voltage of the battery cell is lower than the reference voltage and the current is smaller than the reference current are maintained for the reference time of about 10 minutes or more. The reference time may vary depending on the capacity or characteristics of the battery pack. Therefore, the present invention is not limited thereto. In practice, according to one embodiment a current duration of more than 10 minutes at a value of less than 20 mA means that the battery pack is currently in an open circuit voltage (OCV) state.

If these three conditions are all satisfied as above, the battery pack is determined to be in need of cell balancing. Consequently, the next step, that is, the capacity calculation step (S210) is carried out.

In addition, the determination method of the aforementioned three conditions may be carried out in a variety of sequences, without being limited to the above sequence. Further, the above-mentioned reference voltage, reference current and reference time of the battery cell are provided for illustrative purposes only, and therefore all of them may vary depending on the capacity or characteristics of the battery pack.

Figure 6:
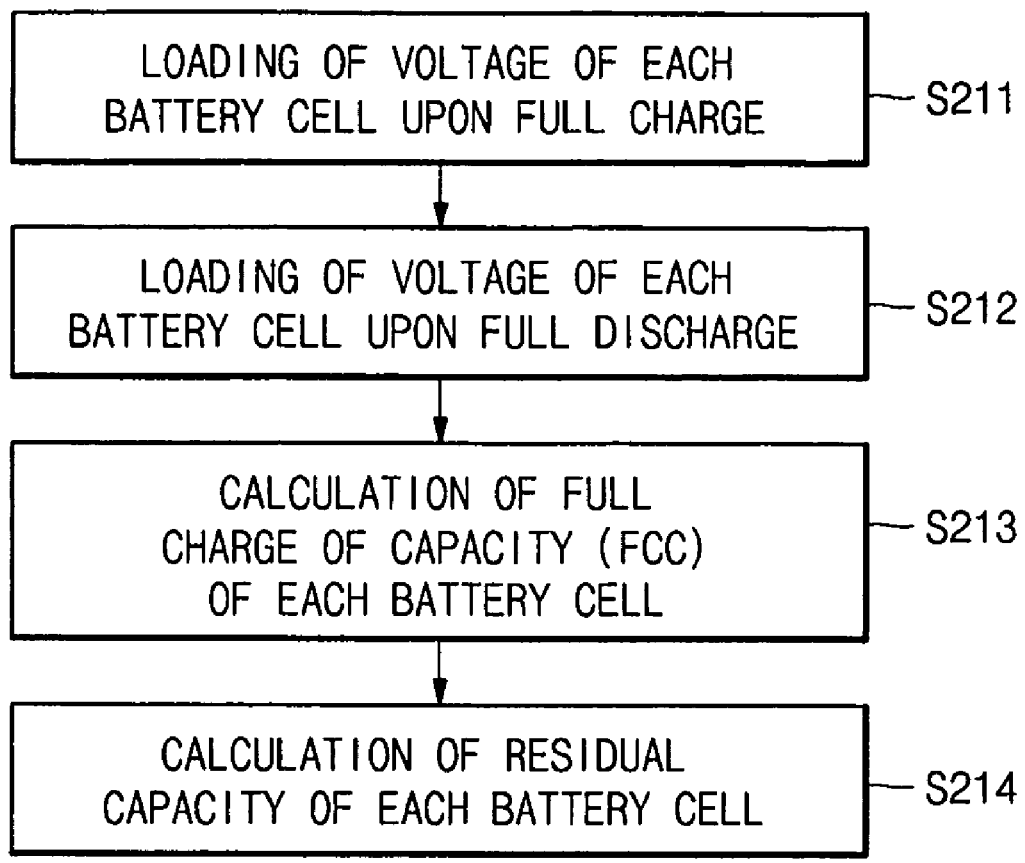
FIG. 6 is a detailed flow chart illustrating a capacity calculation step of a battery cell-balancing method in accordance with one embodiment of the present invention.

FIG. 6 is a detailed flow chart illustrating a capacity calculation step of a battery cell-balancing method in accordance with one embodiment of the present invention.

As shown in FIG. 6, the capacity calculation step includes a step (S211) of loading a voltage of each battery cell upon full charge thereof, a step (S212) of loading a voltage of each battery cell upon full discharge thereof, a step (S213) of calculating a Full Charge of Capacity (FCC) of each battery cell, and a step (S214) of calculating a residual capacity of each battery cell.

Figure 7:
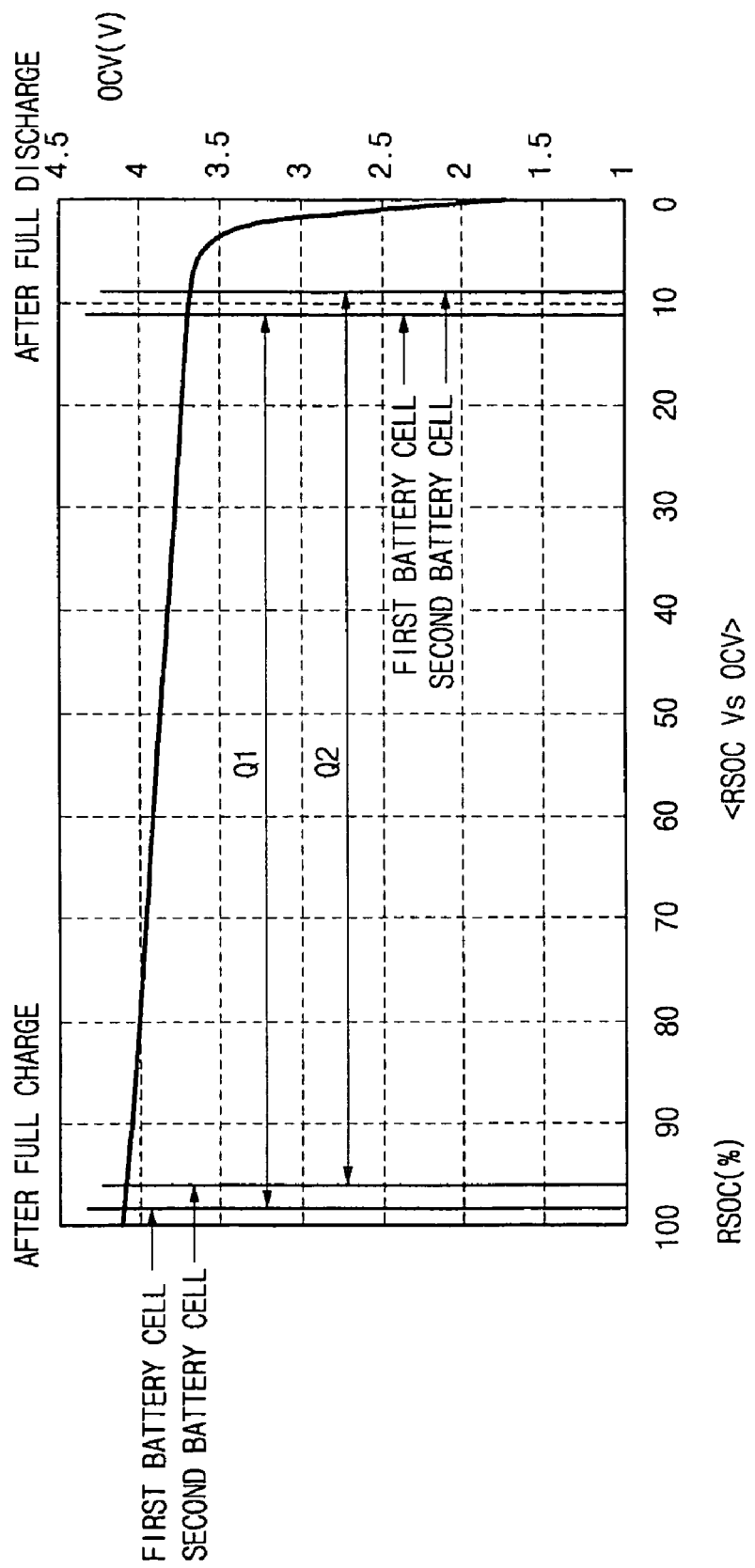
FIG. 7 is a graph illustrating an Open Circuit Voltage (OCV) vs. Relative State Of Charge (RSOC) relationship of a battery cell.

FIG. 7 is a graph illustrating an Open circuit voltage (OCV) vs. Relative State Of Charge (RSOC) relationship of a battery cell.

In FIG. 7, an X-axis represents an RSOC of the battery cells and a Y-axis represents an OCV of the battery cells. Q1 and Q2 in FIG. 7 represent a cell design capacity which is set by the manufacturer. Q1 and Q2 have units of mAh, and are not in %.

Hereinafter, the capacity calculation method will be described in reference to both FIGS. 6 and 7.

The step (S211) of loading a voltage of each battery cell upon full charge thereof includes loading of the voltage of each battery cell upon fill charge (near the end of charge) of the battery pack, which was previously sensed and stored in the memory. As used herein, the term "full charge" means that a voltage of a battery cell maintains, for example, a value of about 4.0 V or higher for about 15 min or more, after the charge of the battery cell was complete. That is, a charge voltage is stabilized after about 15 minutes following the completion of charge. Hence, according to one embodiment, when a voltage of the battery cell is maintained at a value of about 4.0 V or higher, it can be regarded as a full charge state.

As shown in FIG. 7, for example, the first battery cell may have a voltage of about 4.15 V (RSOC: 97%) and the second battery cell may have a voltage of about 4.12 V (RSOC: 96%), upon full charge of the respective battery cells.

The step (S212) of loading a voltage of each battery cell upon full discharge thereof includes loading of the voltage of each battery cell upon full discharge (near the end of discharge) of the battery pack, which was previously sensed and stored in the memory. As used herein, the term "full discharge" means that a maximum voltage that a battery cell maintains, for example, is a value of about 3.7 V or lower for about 15 minutes or more, after the discharge of the battery cell was complete. That is, a discharge voltage is stabilized after about 15 minutes following the completion of discharge. Hence, according to one embodiment, when a voltage of the battery cell is maintained at a value of about 3.7 V or lower, it can be regarded as a discharge state.

As shown in FIG. 7, for example, the first battery cell may have a voltage of about 3.68 V (RSOC: 11%) and the second battery cell may have a voltage of about 3.6 V (RSOC: 8%), after the full discharge of the battery cells.

The step (S213) of calculating a discharge capacity of each battery cell includes calculating a discharge capacity of each battery cell of the battery pack. That is, the step (S213) calculates a Full Charge of Capacity (FCC) of each battery cell. The FCC may be calculated, for example, according to the following equations.

$$FCC1 = Q1*100/(97-11) = 1.163*Q1$$

$$FCC2 = Q2*100/(96-8) = 1.136*Q2$$

In the above equations, FCC1 represents an FCC of the first battery cell, FCC2 represents an FCC of the second battery cell, and each of Q1 and Q2 represents a cell design capacity as defined above.

The step (S214) of calculating a residual capacity of each battery cell includes calculating a residual capacity of each battery cell of the battery pack. That is, the step (S214) calculates a Relative Charge (RC) of each battery cell. The RC may be calculated, for example, according to the following equations.

$$RC1 = FCC1*0.11 = 1.163*Q1*0.11$$

$$RC2 = FCC2*0.08 = 1.1363*Q2*0.08$$

In the above equations, RC1 represents an RC of the first battery cell and RC2 represents an RC of the second battery cell. Assuming that the Q1 and Q2 are identical, it can be seen that the first battery cell has a relatively higher residual capacity.

After the residual capacity of each battery cell is calculated, the balancing start condition determination step (S220) (see FIG. 4) is carried out as described above. That is, it is determined whether the residual capacity difference between the battery cells as calculated above is greater or smaller than the reference value. In the step (S220), the capacity difference between the battery cells can be calculated according to the following equation.

$$\text{Capacity difference} = RC1 - RC2$$

$$= (0.128 - 0.091)*Q1$$

$$= 0.037*Q1$$

Assuming that Q1 is 1300 mAh, the capacity difference is about 48 mAh. Further, assuming that the reference value is 30 mAh, the capacity difference exceeds the reference value. Accordingly, the balancing start conditions are satisfied, and a next step is then executed. The reference value of 30 mAh is provided for illustrative purposes only and therefore it may vary depending on the capacity or characteristics of the battery pack. In addition, when a capacity difference between the individual battery cells, as measured in the balancing start condition determination step (S220), is smaller than the reference value, the battery cell balancing in accordance with the described embodiment of the present invention is terminated. That is, "NO" in the balancing start condition determination step (S220) may be regarded as balancing finishing conditions.

Further, the balancing-required battery cell selection step (S310) includes determining which battery cell or cells are in need of balancing, that is, discharge. For example, the residual capacity of the first battery cell out of the first and second battery cells remains greater than the second battery cell, so it is determined that the first battery cell is in need of discharge.

Next, the balancing time calculation step (S320) includes calculating of a balancing time necessary for the battery cell or cells in need of balancing.

For example, assuming that a balancing current is 5 mA and Q1 is 1300 mAh, the balancing time can be calculated according to the following equation.

$$\text{Balancing time} = 0.037*1300/5 = 9.62 \text{ h}$$

From the above equation, it can be seen that when the first battery cell is discharged at a balancing current of 5 mA, the completion of balancing takes about 9.62 hours.

Figure 8:
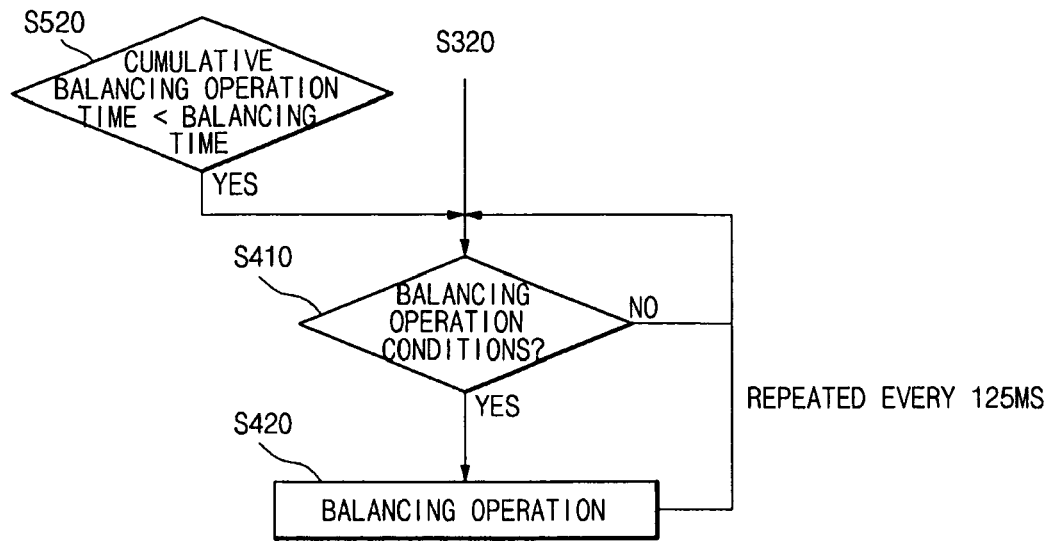
FIG. 8 is a detailed flow chart illustrating a balancing operation step of a battery cell-balancing method in accordance with one embodiment of the present invention.

FIG. 8 is a detailed flow chart illustrating a balancing operation method of a battery cell-balancing method in accordance with one embodiment of the present invention.

As shown in FIG. 8, the balancing operation method may include a balancing operation condition determination step (S410) and a balancing operation step (S420). As described above, the step (S410) and the step (S420) may be repeatedly carried out about every 125 ms.

The balancing operation condition determination step (S410) includes determining whether or not the battery pack is under charge or is at rest until discharge following the charge, or determining whether or not the discharge current of the battery pack is smaller than the reference current if the battery pack is under discharge. When the discharge current of the battery pack is equal to or greater than the reference current, the battery cell balancing according to the described embodiment of the present invention is not performed. In addition, the balancing operation step (S420) includes discharge of the selected battery cell or cells. After the balancing operation step (S420), the balancing operation condition determination step (S410) is carried out again. That is, for example, the balancing operation condition determination step (S410) and the balancing operation step (S420) may be repeatedly carried out about every 125 ms.

In the context of embodiments of the present invention, the balancing operation condition determination step (S410) may be carried out not only after the balancing time calculation step (S320) is carried out, as described above, but also when the cumulative balancing operation time, as measured in the balancing time comparison and determination step (520), does not exceed the calculated balancing time. In other words, the balancing of the battery cells may be carried out even when a maximum voltage of the battery cells is larger than the reference voltage (e.g. 2 to 3.7 V). In this regard, when the balancing time has not exceeded the reference time yet, the balancing operation condition determination step (S410) and the balancing operation step (S420) may be sequentially carried out. Alternatively, the balancing operation step (S420) may also be carried out immediately after the balancing time comparison and determination step (520).

Figure 9:
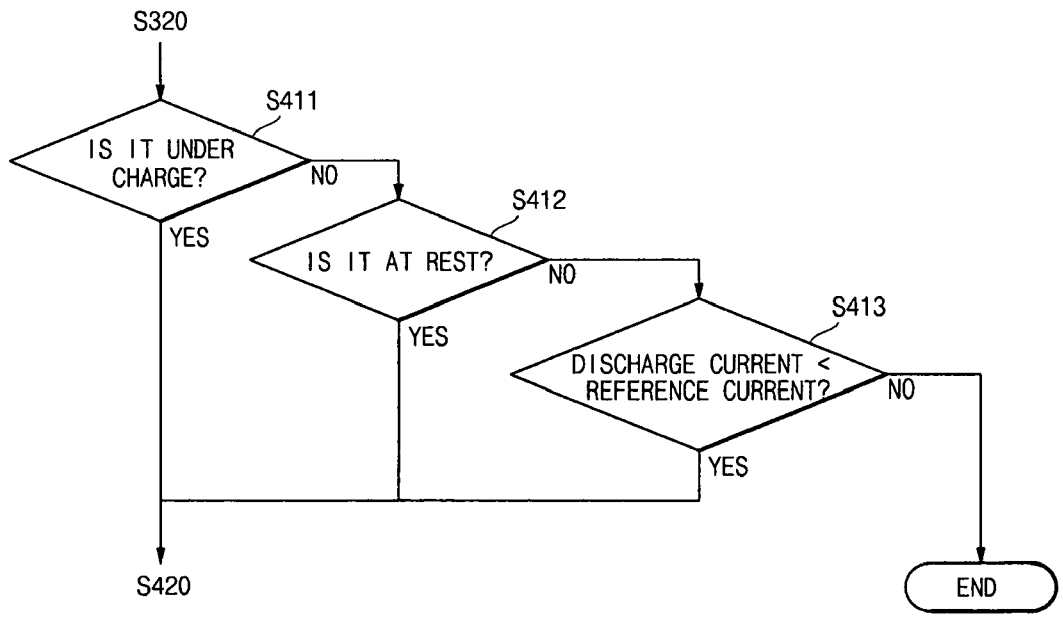
FIG. 9 is a detailed flow chart illustrating a balancing operation condition determination step of a battery cell-balancing method in accordance with one embodiment of the present invention.

FIG. 9 is a detailed flow chart illustrating a balancing operation condition determination step of a battery cell-balancing method in accordance with one embodiment of the present invention.

As shown in FIG. 9, the balancing operation condition determination step includes a step (S411) of determining whether or not the battery pack is under charge, a step (S412) of determining whether or not the battery pack is at rest, and a step (S413) of determining whether or not a discharge current of the battery pack is smaller than the reference current. That is, the balancing operation step (S420) is carried out when the battery pack is under charge or at rest or if the discharge current of the battery pack is smaller than the reference current even when the battery pack is under discharge. Here, the reference current may be set to a value of about 100 mA, for example, but the present invention is not limited thereto. That is, the reference current value may vary depending on the capacity or characteristics of the battery pack. In addition, the determination method of the aforementioned three conditions may be carried out in a variety of sequences, without being limited to the above sequence.

In addition, based on the results of the balancing operation condition determination step (S410), when the battery pack is not under charge, is not at rest and is discharged at a current larger than the reference current, the battery cell balancing in accordance with the described embodiment of the present invention is terminated.

Further, the balancing operation determination step (S410) is carried out at regular intervals. For example, the balancing operation condition determination step (S410) is carried out about every 125 ms, as described above. That is, the balancing operation conditions are determined at regular intervals of 125 ms, whereby the balancing operation of the battery cells is not allowed when a sudden discharge of the battery pack takes place. In other words, as described above, the balancing check condition determination step (S100) is carried out about every 10 minutes to thereby determine whether the battery cell balancing will be carried out or not, whereas the balancing operation condition determination step (S410) is carried out about every 125 ms such that the balancing operation is interrupted (e.g., immediately interrupted) upon a sudden discharge of the battery pack.

Figure 10A:
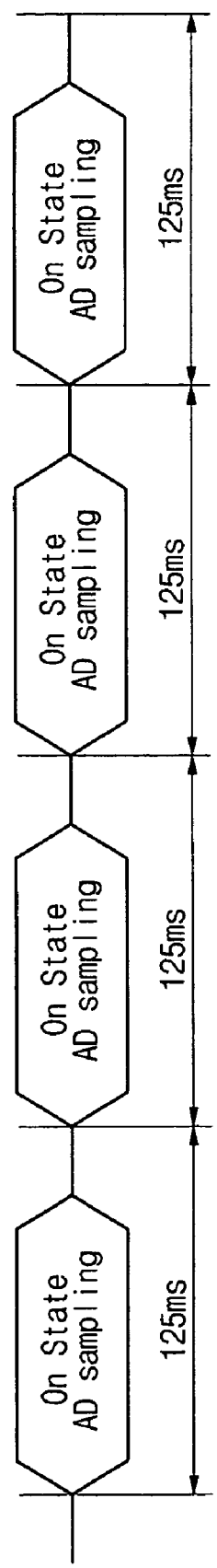

FIGS. 10*a* and 10*b* are timing views illustrating a balancing timing of a battery cell-balancing method in accordance with one embodiment of the present invention.

As shown in FIG. 10*a*, the battery cell balancing in accordance with one embodiment of the present invention may be periodically carried out at intervals of about 125 ms. More specifically, the battery cell balancing, as shown in FIG. 10*b*, may include a non-balancing section composed of an offset sampling stage and a temperature and voltage sampling stage, and a balancing section for practical discharge of the battery cells.

In the offset sampling stage of the non-balancing section, a zero point of a voltage sensing circuit or the like is adjusted. In the temperature and voltage sampling stage of the non-balancing section, temperatures of the battery pack and voltages of battery cells are sampled. The temperature and voltage sampling stage is carried out four times (10 ms each), and an average value thereof can be used as the basic data for balancing of the battery cells. From the temperature and voltage sampling stage, the basic data are obtained including voltages upon fall charge of the battery cells, voltages upon full discharge of the battery cells and current voltages of the battery cells. The charge current or discharge current can also be calculated from the current voltages.

According to one embodiment of the present invention, a cycle of 125 ms may be composed of a non-balancing section of 45 ms and a balancing section of 80 ms, but the present invention is not limited thereto. That is, the above specified time and periodicity may vary depending on the characteristics of the voltage sensing and balancing circuit or characteristics of the control unit.

In one embodiment according to the present invention, if the balancing of the battery cell is determined to be carried out for a given period of time by an algorithm executed during the first balancing section, such a state is maintained for about 10 minutes. That is, although the non-balancing section and the balancing section are continuously repeated, the balancing operation step (S400) is repeatedly carried out only for the precalculated balancing time, from the second balancing section following the first balancing section. When the predetermined time of, for example, about 10 minutes has passed with repetition of the balancing operation step (S400), the balancing check condition determination step (S100) will re-commence from the balancing section.

Meanwhile, there may be a situation where the battery pack is discharged, for example due to the operation of a hand-held power tool, during the balancing operation step (S400). In this case, the battery balancing should be stopped to achieve a stable output of the battery pack. In this manner, discharge of the battery pack is checked for each balancing section. That is, whether or not the battery pack is currently discharged to a level above the reference current is continuously checked every balancing section. In other words, the balancing operation condition determination step (S410) is carried out, for example, at intervals of about 125 ms. When it is confirmed that the battery pack was discharged as checked above, the balancing operation step (S420) is temporally stopped. When discharge of the battery pack is complete, the balancing operation step (S420) will re-commence.

In summary, according to one embodiment, the balancing check condition determination step (S100) may be carried out with a relatively long interval (for example, about 10 minutes), whereas the balancing operation step (S400) may be carried out with a relatively short interval (for example, about 125 ms). However, the present invention is not limited thereto.

Figure 11A:
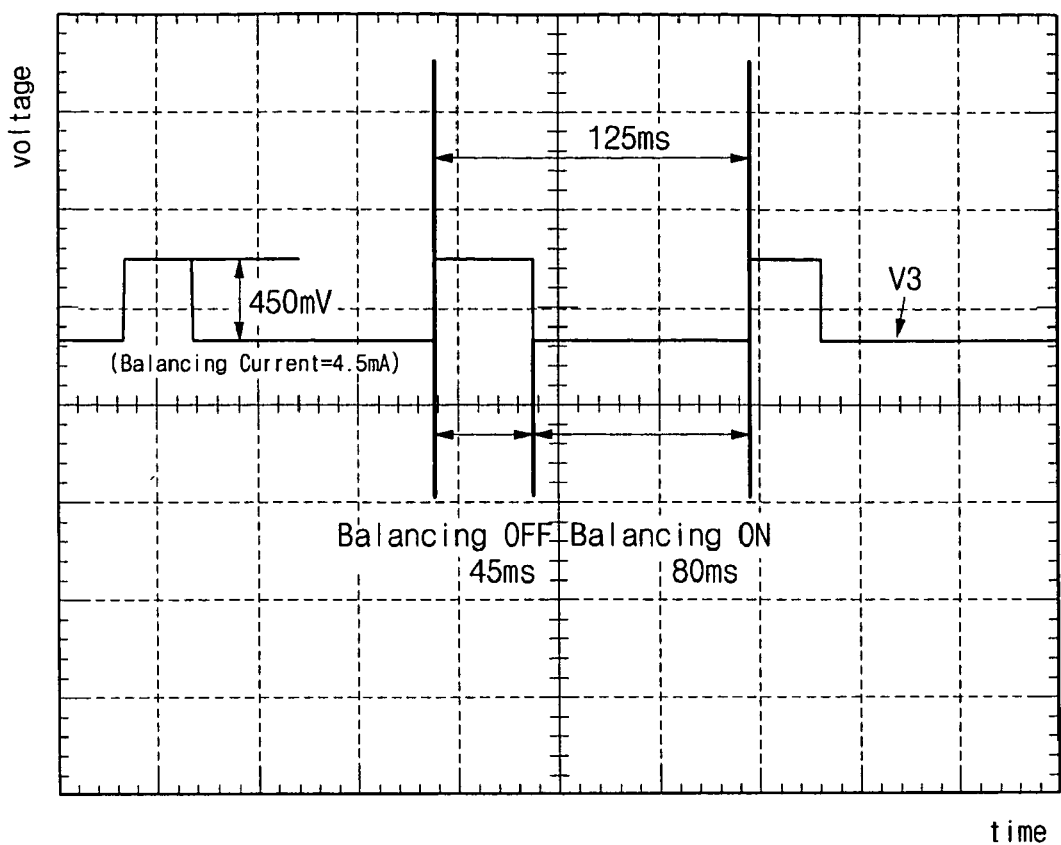
FIG. 11a is a view illustrating changes of a voltage between ends of a resistor connected to a battery cell during a balancing process, in a battery cell-balancing method in accordance with one embodiment of the present invention.
Figure 11B:
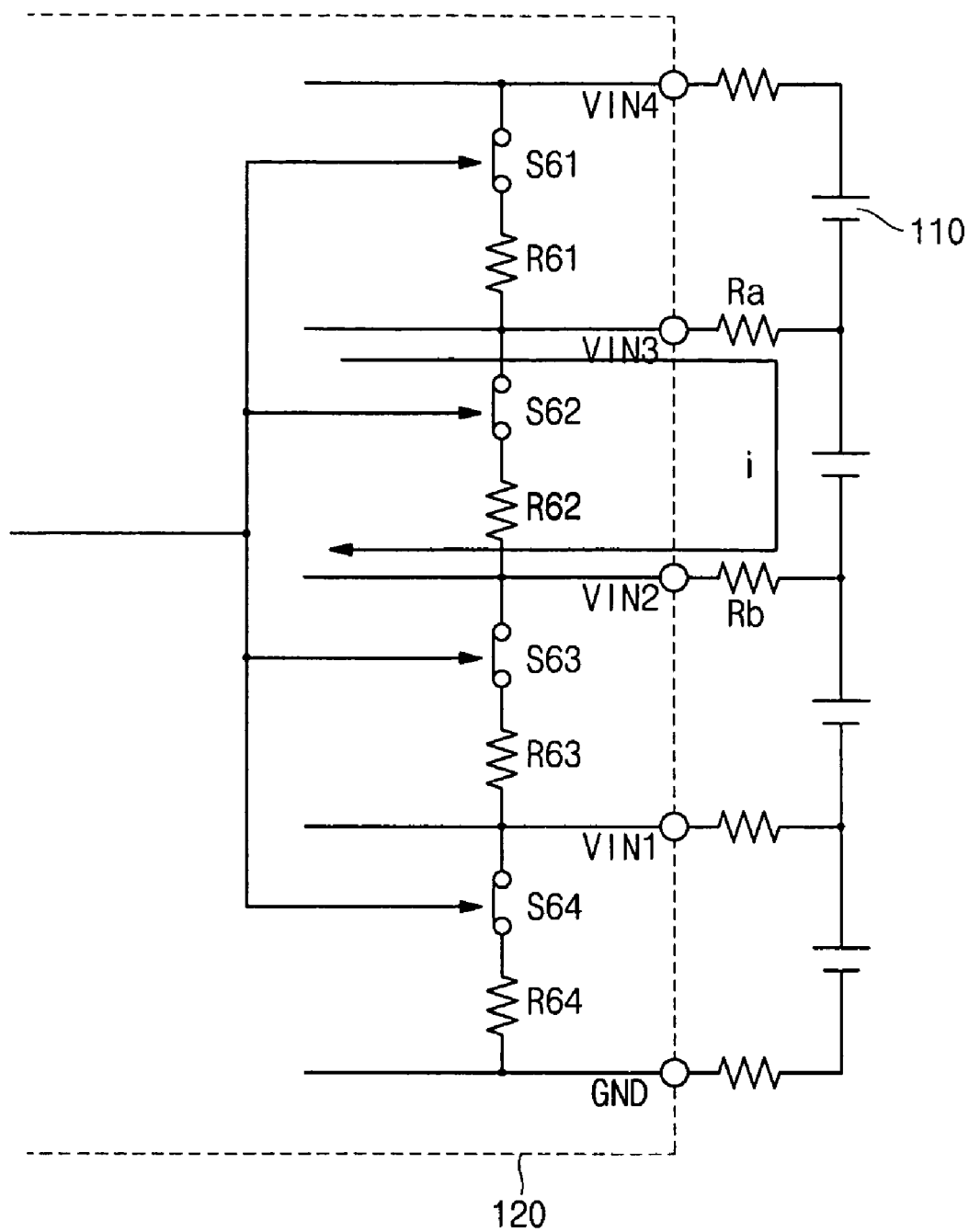

FIG. 11a is a view illustrating changes of voltages between ends of a resistor connected to a battery cell during a balancing process, in a battery cell-balancing method in accordance with one embodiment of the present invention, and FIG. 11b is a circuit diagram illustrating a balancing circuit and a battery cell corresponding to FIG. 11a.

As shown in FIG. 11a, the balancing-off state is maintained for about 45 ms, whereas the balancing-on state is maintained for about 80 ms. That is, one cycle has a duration of about 125 ms, as described above. Further, as shown in FIG. 11b, resistors Ra and Rb may be further connected between the voltage sensing and balancing circuit 120 and the battery cell 110. A balancing resistor R62 and a balancing switch S62 are contained in the voltage sensing and balancing circuit 120.

In this manner, for example when the balancing switch S62 is turned-on, the balancing switch S62, the resistor Ra, the battery cell 110, the resistor Rb and the resistor R62 together form a closed circuit, so that the battery cell 110 is discharged with a flow of balancing current. Assuming that a voltage (V3) of the battery cell 110 is 3.0 V, a balancing current flow of about 4.3 mA is calculated according to the following equation.

Balancing current=$V3/Rt$=3.0 V/700 ohm=4.3 mA

In the above equation, Rt=R62+Ra+Rb, R62 is about 500±100 ohm, and Ra and Rb may each be 100 ohm.

Here, the resistor R62 is included inside an integrated circuit and has an error of about ±100 ohm. For this reason, the balancing current may merely be calculated mathematically, but it may be practically uncertain to obtain an accurate value. If an error of the resistor R62 is significantly greater or smaller than the above-specified range of ±100 ohm, there is also a significant increase of an error in practical balancing current.

As shown in FIG. 11a, for example the voltages between ends of the resistor Ra were measured in the balancing-off section and the balancing-on section, respectively. The voltage (V3) between ends of the resistor Ra is further increased by about 450 mV in the balancing-off section. Therefore, the current is calculated as follows.

Current=$V3/Ra$=450 mV/100 ohm=4.5 mA

From these results, it can be seen that the balancing current calculated using the total resistance (Rt) and the current calculated using one resistance (Ra) alone are substantially the same. Therefore, it can be confirmed that the resistor R62 provided in the integrated circuit is within the error range, and consequently a reasonable level of the balancing current is allowed to flow.

Figure 12A:
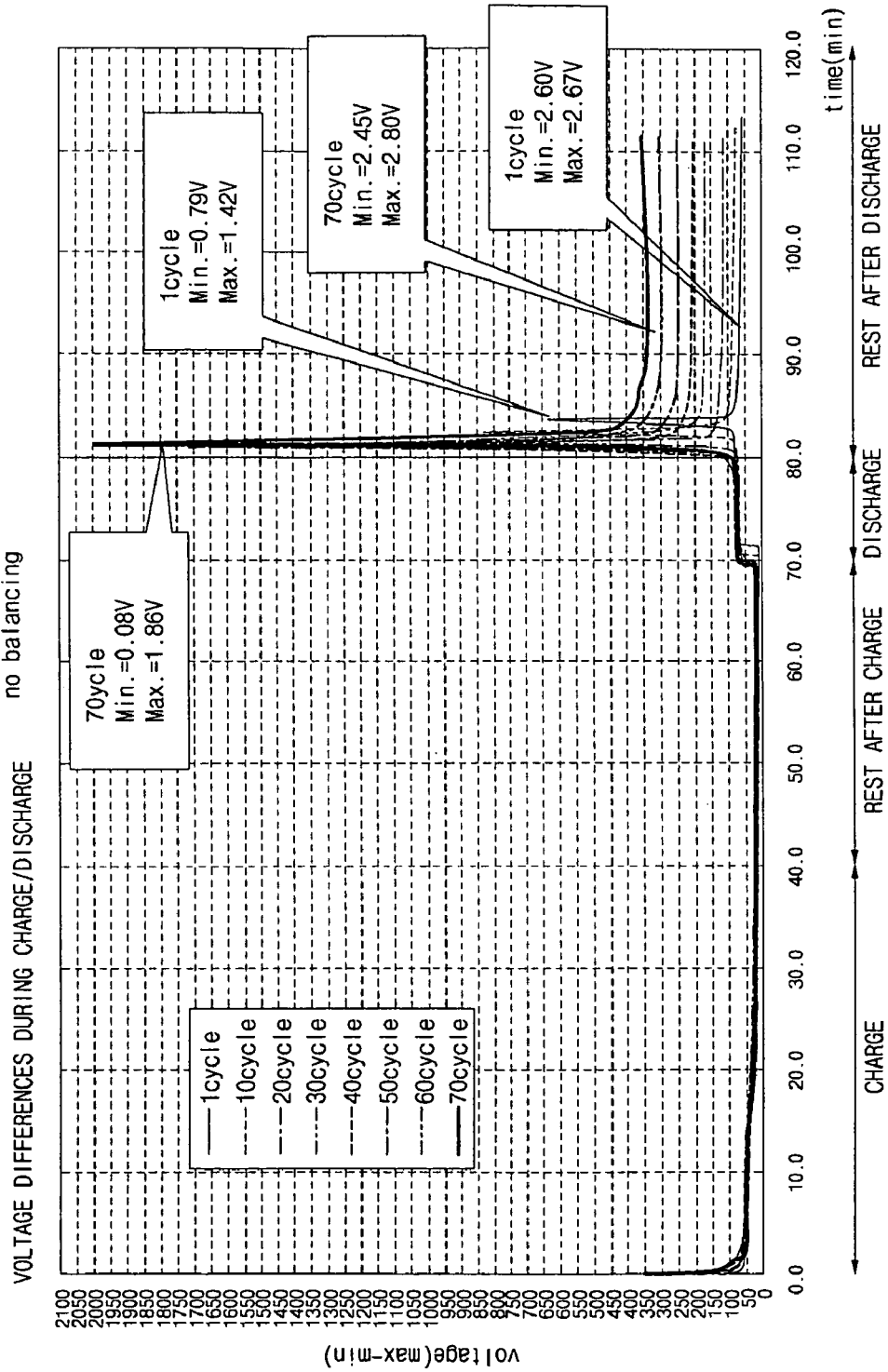
FIG. 12a is a graph illustrating a voltage difference depending on the number of charge/discharge cycles when the balancing of a battery cell is not carried out.
Figure 12B:
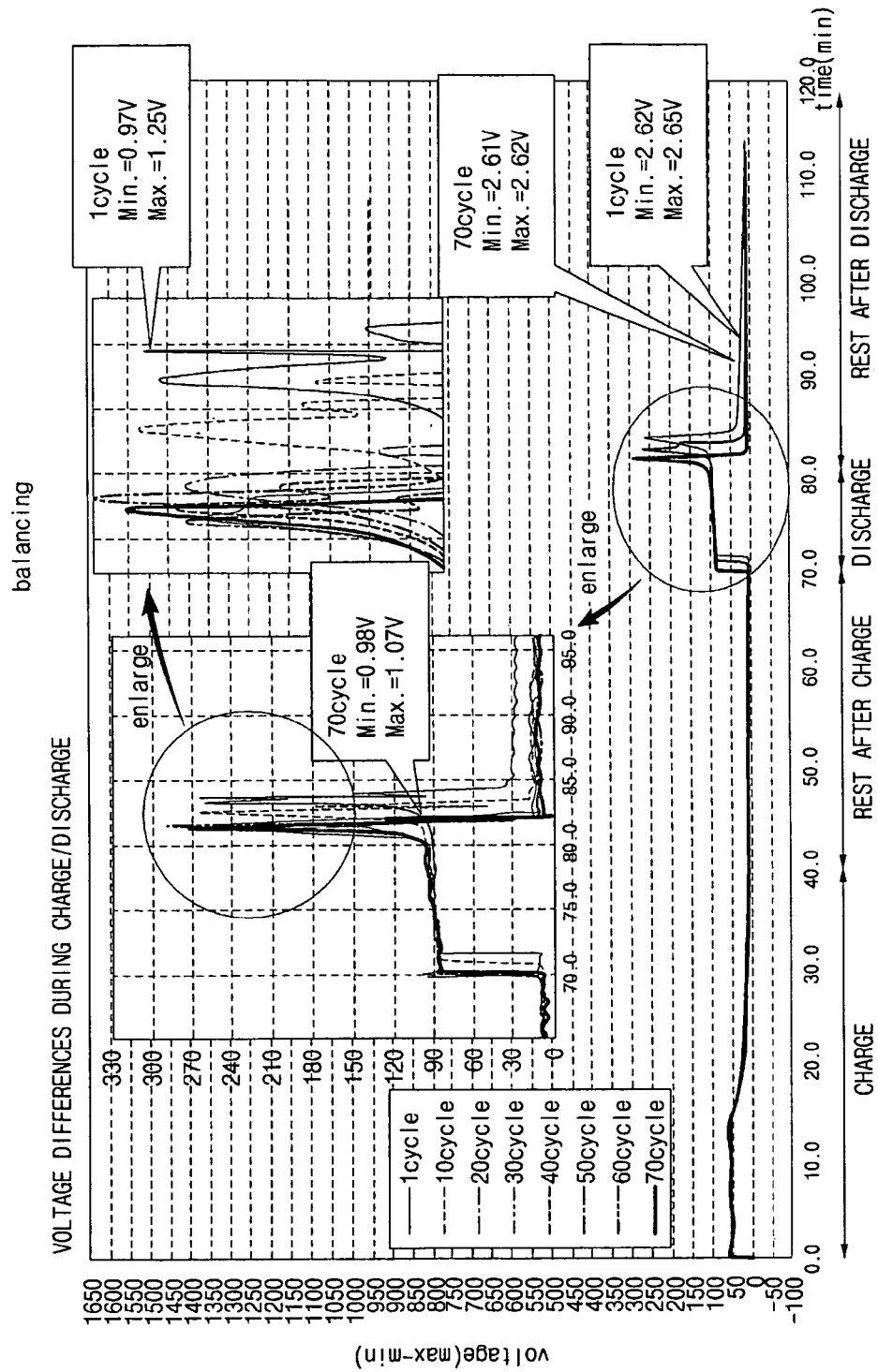
FIG. 12b is a graph illustrating a voltage difference depending on the number of charge/discharge cycles when the balancing of a battery cell is carried out according to one embodiment of the present invention.

FIG. 12a is a graph illustrating a voltage difference depending on the number of charge/discharge cycles when the balancing of battery cells is not carried out, and FIG. 12b is a graph illustrating a voltage difference depending on the number of charge/discharge cycles when the balancing of battery cells is carried out according to one embodiment of the present invention.

A charge/discharge cycle test employed a 4S1P battery pack. The charge of the battery pack was carried out at 16.8 V and 4 A, and the charge operation was cut-off at a charge current of 50 mA. The discharge of the battery pack was carried out at 4V and 7 A, after a rest period of 30 minutes. The test was carried out at a temperature of about 26° C.

When the balancing of the battery cell was not carried out as shown in FIG. 12a, at the $1^{st}$ cycle immediately after the discharge, a minimum voltage of the battery cells is 0.79 V and a maximum voltage of the battery cells is 1.42 V, thus representing a voltage difference of about 0.63 V therebetween. At the $70^{th}$ cycle immediately after the discharge, a minimum voltage of the battery cells is 0.08 V and a maximum voltage of the battery cells is 1.86 V, thus representing a voltage difference of about 1.78 V.

Further, at the $1^{st}$ cycle after the discharge and rest period, a minimum voltage of the battery cells is 2.60 V and a maximum voltage of the battery cells is 2.67 V, thus representing a voltage difference of about 0.07 V. Further, at the $70^{th}$ cycle after the discharge and rest period, a minimum voltage of the battery cells is 2.45 V and a maximum voltage of the battery cells is 2.80 V, thus representing a voltage difference of about 0.35 V.

That is, it can be seen that the battery pack with no balancing of the battery cells exhibits an increased voltage difference between the battery cells as the number of charge/discharge cycles increases. In particular, as the number of charge/discharge cycles increases, a voltage difference between the battery cells is large immediately after the discharge, and a minimum voltage value of the battery cell approximates to nearly 0 V.

When the balancing of the battery cells was made as shown in FIG. 12b, at the $1^{st}$ cycle immediately after the discharge, a minimum voltage of the battery cells is 0.97 V and a maximum voltage of the battery cells is 1.25 V, thus representing a voltage difference of about 0.28 V. Further, at the $70^{th}$ cycle immediately after the discharge, a minimum voltage of the battery cells is 0.98 V and a maximum voltage of the battery cells is 1.07 V, thus representing a voltage difference of about 0.09 V.

Further, at the $1^{st}$ cycle after the discharge and rest period, a minimum voltage of the battery cells is 2.62 V and a maximum voltage of the battery cells is 2.65 V, thus representing a voltage difference of about 0.03 V. Further, at the $70^{th}$ cycle after the discharge and rest period, a minimum voltage of the battery cells is 2.61 V and a maximum voltage of the battery cells is 2.62 V, thus representing a voltage difference of about 0.01 V.

That is, it can be seen that the battery pack, where the battery cell balancing was carried out as in one embodiment of the present invention, exhibits no increase in a voltage difference between the battery cells, even when the number of charge/discharge cycles increases. Particularly, there is substantially no voltage difference between the battery cells immediately after the discharge as the number of charge/discharge cycles increases, thus representing no occurrence of deep discharge of a certain battery cell.

Voltage differences, minimum voltages and capacities obtained immediately after the discharge are compared as in Table 1 below.

TABLE 1

| | Battery pack with balancing function | | | Battery pack without balancing function | | |
|---|---|---|---|---|---|---|
| Cycles | Voltage difference | Minimum voltage | Capacity (mAh) | Voltage difference | Minimum voltage | Capacity (mAh) |
| 1 | 0.28 V | 0.97 V | 1440 | 0.63 V | 0.79 V | 1474 |
| 70 | 0.09 V | 0.98 V | 1402 (97.4%) | 1.78 V | 0.08 V | 1414 (96%) |

In this manner, it can be seen that when the battery cell is balanced, a minimum voltage of the battery cells immediately after the discharge is maintained at a value of about 1 V. Further, it can also be seen that there is no increase in the voltage difference between the battery cells. On the other hand, when the battery cells were not balanced, it can be seen that a minimum voltage of the battery cells upon the discharge is significantly relatively decreased. Further, it can also be seen that there is a significant increase in the voltage difference between the battery cells. Regarding the capacity of the battery pack, it can be seen that the battery pack having a balancing function exhibits a decrease of the capacity to 97.4% after 70 cycles, whereas the battery pack having no balancing function exhibits a decrease of the capacity to 96% after 70 cycles. That is, the battery pack without a balancing function exhibits accelerated deterioration of the battery capacity as the charge/discharge cycles are repeated.

As apparent from the above description, one embodiment according to the present invention is configured to carry out the balancing of battery cells when a residual capacity or voltage difference between the individual battery cells exceeds the reference value under the condition where a maximum voltage of the battery cells is smaller than the reference voltage (e.g. about 2.0 to 3.7 V). Therefore, excellent balancing of the battery cells is achieved even near the end of discharge.

Further, embodiments of the present invention can prevent deep discharge of a certain battery cell or cells without an overdischarge control unit, through carrying out the battery cell balancing near the end of discharge, not the end of charge.

Although certain exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed are:

1. A balancing method for a battery pack comprising a plurality of battery cells, the method comprising:
determining during a time period that is greater than or equal to a reference time:
whether or not a maximum voltage among voltages of the plurality of battery cells is smaller than a reference voltage; and
whether or not a current of the battery pack is smaller than a reference current;
if, during the time period, the maximum voltage is less than the reference voltage and the current is less than the reference current such that a first condition exists, determining whether or not a second condition for performing balancing of the battery cells exists;
if the second condition exists, calculating a balancing time; and
performing a balancing operation in accordance with the balancing time.

2. The balancing method of claim 1, wherein the reference voltage is between about 2.0V and about 3.7V.

3. The balancing method of claim 1, wherein the determining whether or not the second condition exists comprises determining whether or not a residual capacity difference or a voltage difference between two of the plurality of battery cells exceeds a reference value.

4. The balancing method of claim 1, wherein the calculating the balancing time comprises:
selecting a battery cell to be discharged from among the plurality of battery cells; and
calculating the balancing time for the selected battery cell.

5. The balancing method of claim 4, wherein the selecting the battery cell to be discharged comprises selecting at least one battery cell other than a battery cell having a lowest residual capacity from among the plurality of battery cells.

6. The balancing method of claim 5, wherein the calculating the balancing time comprises calculating a balancing time for a residual capacity of the selected at least one battery cell to become substantially equal to the lowest residual capacity.

7. The balancing method of claim 4, wherein the selecting the battery cell to be discharged comprises selecting at least one battery cell other than a battery cell having a lowest voltage from among the plurality of battery cells.

8. The balancing method of claim 7, wherein the calculating the balancing time comprises calculating a balancing time for a voltage of the selected at least one battery cell to become substantially equal to the lowest voltage.

9. The balancing method of claim 1, wherein the performing balancing operation comprises discharging a selected battery cell from among the plurality of battery cells for the calculated balancing time.

10. The balancing method of claim 9, wherein the discharging of the selected battery cell is performed intermittently.

11. The balancing method of claim 1, wherein either a charge current or a discharge current can be used as the current compared to the reference current.

12. A balancing method for a battery pack comprising a plurality of battery cells, the method comprising:
determining whether or not a first condition exists, the first condition comprising:
a maximum voltage among voltages of the plurality of battery cells is smaller than a reference voltage during a time period that exceeds a reference time; and
a current of the battery pack is smaller than a reference current during the time period;
determining whether or not a second condition exists;
if both of the first and second conditions exist, calculating a balancing time;
performing balancing of the battery cells in accordance with the balancing time; and
if the maximum voltage is equal to or greater than the reference voltage, determining whether or not the balancing time was previously set.

13. The balancing method of claim 12, further comprising determining whether or not a cumulative time for the balancing operation is less than the balancing time, wherein the balancing operation is performed if the cumulative time is less than the balancing time.

14. The balancing method of claim 1, wherein the determining whether or not the second condition exists comprises:
   calculating full charge capacities (FCCs) of the plurality of battery cells;
   calculating residual capacities of the plurality of battery cells and residual capacity differences between the battery cells, using the calculated FCCs; and
   determining whether or not the residual capacity difference between two of the plurality of battery cells exceeds a reference value.

15. The balancing method of claim 14, wherein if the residual capacity difference exceeds the reference value, the second condition exists and the calculating balancing time further comprises selecting a battery cell to be balanced from among the plurality of battery cells, wherein the selected battery cell is not a battery cell having a lowest residual capacity of the plurality of battery cells.

16. The balancing method of claim 1, wherein the balancing operation continues to be performed if the first and second conditions exist or if a cumulative time for the balancing operation did not yet exceed the calculated balancing time.

17. The balancing method of claim 1, wherein the performing balancing operation comprises:
   determining balancing operation conditions comprising determining whether or not the battery pack is under charge or is at rest until discharge following the charge, or if the battery pack is under discharge, determining whether or not a discharge current of the battery pack is smaller than a reference current; and
   if the balancing operation conditions are met, discharging a selected battery cell from among the plurality of battery cells.

18. The balancing method of claim 17, wherein if the battery pack is not under charge, is not at rest and the discharge current of the battery pack is larger than the reference current, balancing of the plurality of battery cells is terminated.

19. The balancing method of claim 17, wherein the balancing operation is temporarily stopped while the battery pack is discharged at a level above the reference current.

* * * * *